United States Patent
Sazuka

(10) Patent No.: US 12,507,964 B2
(45) Date of Patent: Dec. 30, 2025

(54) BIOLOGICAL-INFORMATION EVALUATING DEVICE AND METHOD OF EVALUATING BIOLOGICAL INFORMATION

(71) Applicant: Sony Corporation, Tokyo (JP)

(72) Inventor: Naoya Sazuka, Tokyo (JP)

(73) Assignee: Sony Corporation, Tokyo (JP)

( * ) Notice: Subject to any disclaimer, the term of this patent is extended or adjusted under 35 U.S.C. 154(b) by 1050 days.

(21) Appl. No.: 17/047,253

(22) PCT Filed: Apr. 2, 2019

(86) PCT No.: PCT/JP2019/014660
§ 371 (c)(1),
(2) Date: Nov. 3, 2020

(87) PCT Pub. No.: WO2019/202971
PCT Pub. Date: Oct. 24, 2019

(65) Prior Publication Data
US 2021/0145368 A1 May 20, 2021

(30) Foreign Application Priority Data
Apr. 17, 2018 (JP) .................. 2018-078807

(51) Int. Cl.
*A61B 5/00* (2006.01)
*A61B 5/024* (2006.01)
(Continued)

(52) U.S. Cl.
CPC ............ *A61B 5/7278* (2013.01); *A61B 5/165* (2013.01); *A61B 5/742* (2013.01); *G06F 3/14* (2013.01);
(Continued)

(58) Field of Classification Search
CPC ....... A61B 5/7278; A61B 5/165; G16H 50/30
See application file for complete search history.

(56) References Cited

U.S. PATENT DOCUMENTS 6,609,024 B1 * 8/2003 Ryu ................. A61B 5/165
128/925
2007/0173733 A1 * 7/2007 Le .................... A61B 5/165
600/544
(Continued)

FOREIGN PATENT DOCUMENTS

| CN | 101331490 A | 12/2008 |
|---|---|---|
| CN | 102551726 A | 7/2012 |

(Continued)

OTHER PUBLICATIONS

International Search Report issued in International Patent Application No. PCT/JP2019/014660 on Jun. 25, 2019 and English translation of same. 5 pages.

(Continued)

*Primary Examiner* — Eugene L Kim
*Assistant Examiner* — Christopher Glenn
(74) *Attorney, Agent, or Firm* — K&L Gates LLP

(57) ABSTRACT

A biological-information evaluating device according to an embodiment of the present disclosure includes a signal processing circuit that generates a feature value of an observation target waveform for each of pieces of observation data obtained through observation of a living body for a predetermined period, on a basis of a plurality of pieces of partial observation data contained in each of the pieces of observation data and each having a period shorter than an observation period of the observation data. An observation target of this biological-information evaluating device includes, for example, a human or an animal.

12 Claims, 18 Drawing Sheets

(51) Int. Cl.
*A61B 5/16* (2006.01)
*A61B 5/369* (2021.01)
*G06F 3/14* (2006.01)
*G16H 50/30* (2018.01)

(52) U.S. Cl.
CPC .............. *G16H 50/30* (2018.01); *A61B 5/024* (2013.01); *A61B 5/369* (2021.01); *A61B 5/4266* (2013.01); *A61B 5/7267* (2013.01); *G06F 2218/12* (2023.01)

(56) References Cited

U.S. PATENT DOCUMENTS

| | | | | |
|---|---|---|---|---|
| 2009/0131764 | A1* | 5/2009 | Lee ...................... | A61B 5/0205 600/301 |
| 2014/0214335 | A1* | 7/2014 | Siefert ................. | A61B 5/0205 702/19 |
| 2015/0227702 | A1* | 8/2015 | Krishna ............... | A61B 5/7257 705/2 |
| 2016/0321803 | A1* | 11/2016 | Lamash ............... | A61B 6/5217 |
| 2017/0000356 | A1* | 1/2017 | Smith, Sr. ............ | A61B 5/0022 |

FOREIGN PATENT DOCUMENTS

| | | |
|---|---|---|
| CN | 104637503 A | 5/2015 |
| CN | 105378052 A | 3/2016 |
| CN | 105979859 A | 9/2016 |
| JP | 2005-518238 A | 6/2005 |
| JP | 2008276314 A | 11/2008 |
| JP | 2009-078139 A | 4/2009 |
| JP | 2009-521246 A | 6/2009 |
| JP | 2010-154998 A | 7/2010 |
| JP | 2013-202123 A | 10/2013 |
| KR | 20080074099 A | 8/2008 |
| KR | 101700069 B1 | 1/2017 |
| WO | WO2015/039689 A1 | 3/2015 |
| WO | WO 2017/096358 A1 | 6/2017 |

OTHER PUBLICATIONS

Written Opinion issued in International Patent Application No. PCT/JP2019/014660 on Jun. 25, 2019. 5 pages.

A. Rommel et al., "Altered EEG spectral power during rest and cognitive performance: a comparison of preterm-born adolescents to adolescents with ADHD," Eur Child Adolesc Psychiatry, (2017) 26:1511-1522. 12 pages.

Gwizdka Jacek et al: "Temporal dynamics of eye-tracking and EEG during reading and relevance decisions," Journal of the Association for Information Science and Technology, [Online] vol. 68, No. 10, Aug. 11, 2017 (Aug. 11, 2017), pp. 2299-2312, XP055800284, ISSN: 2330-1635, DOI: 10.1002/asi.23904 Retrieved from the Internet: URL: https://api.wiley.com/onlinelibrary/tdm/v1/articles/10.1002%2Fasi.23904> [retrieved on Apr. 30, 2021]. 14 pages.

* cited by examiner

[FIG. 1]
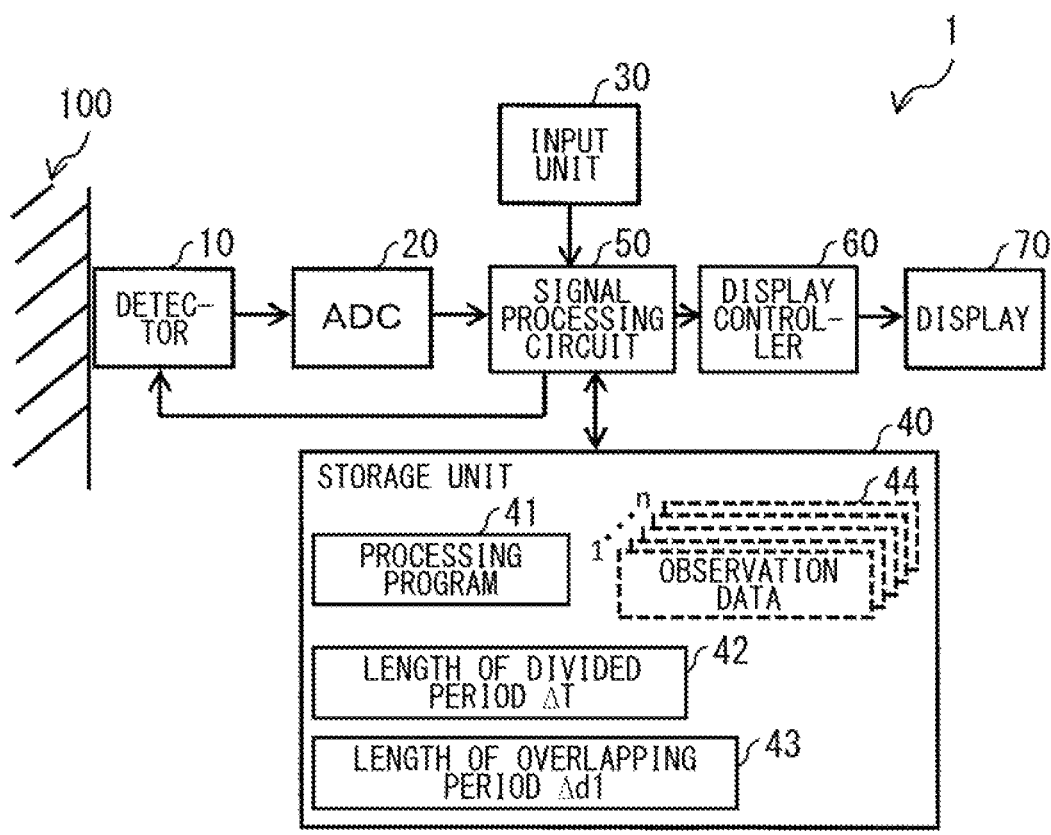

[FIG.2]
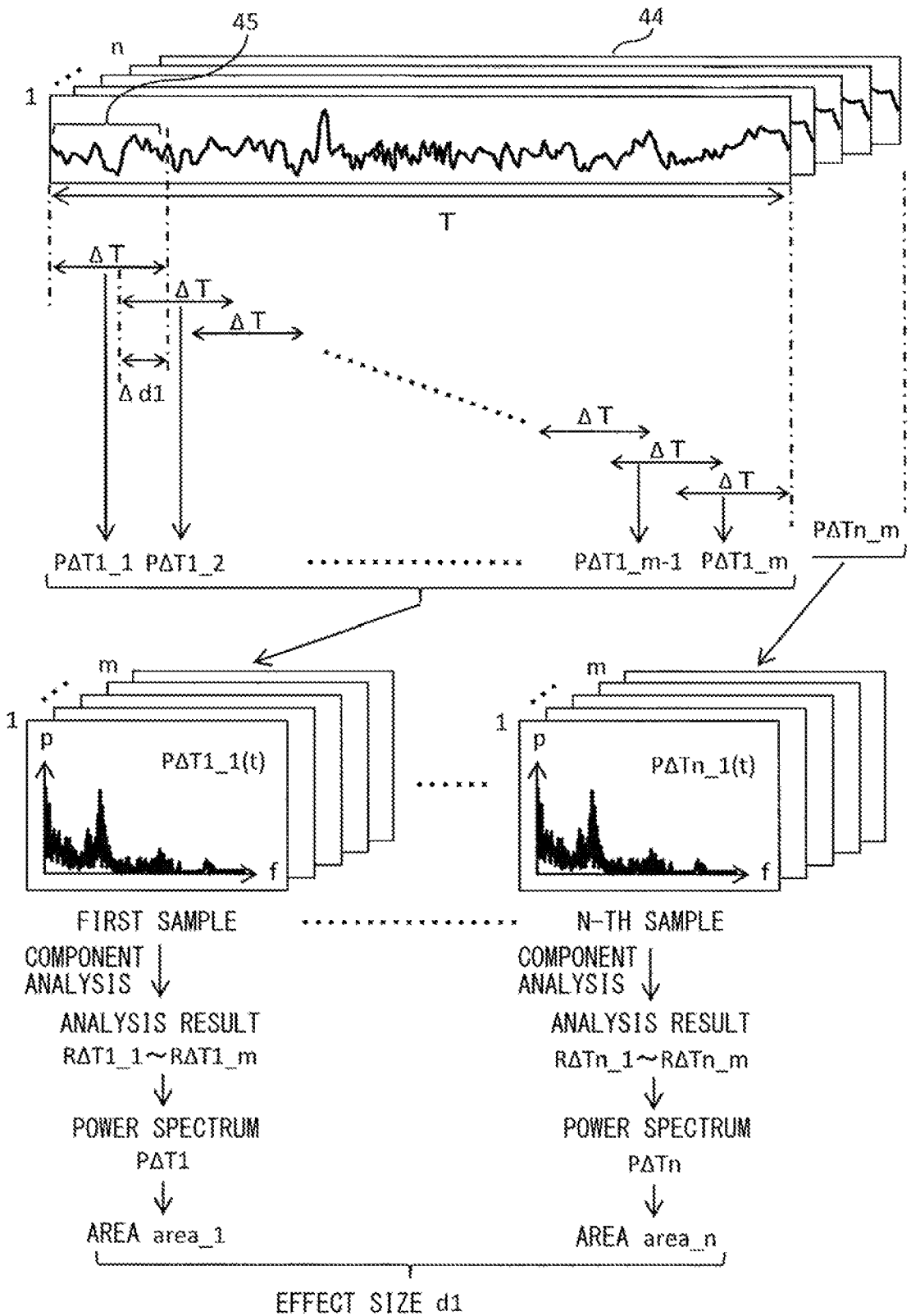

[FIG. 3]
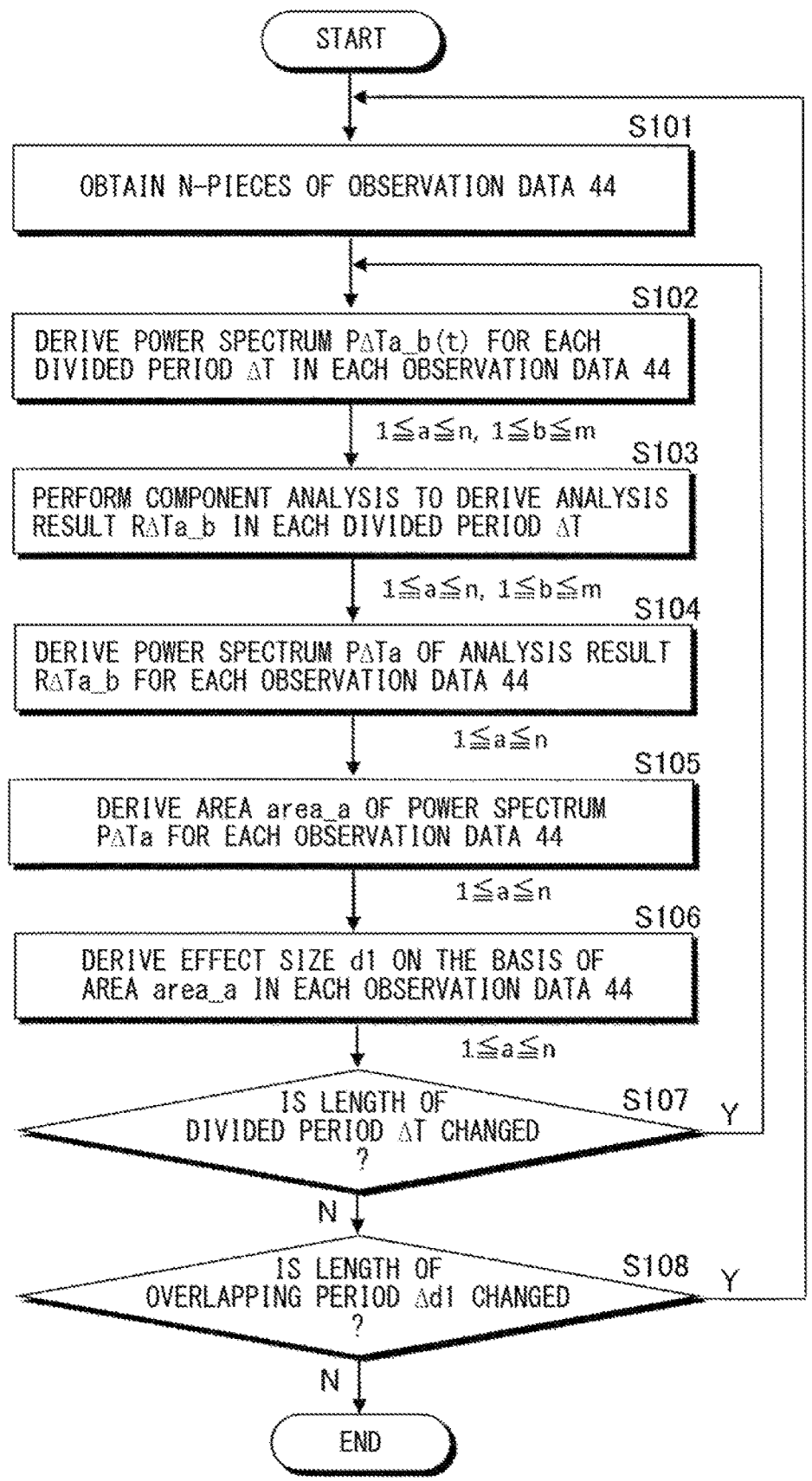

[ FIG. 4 ]
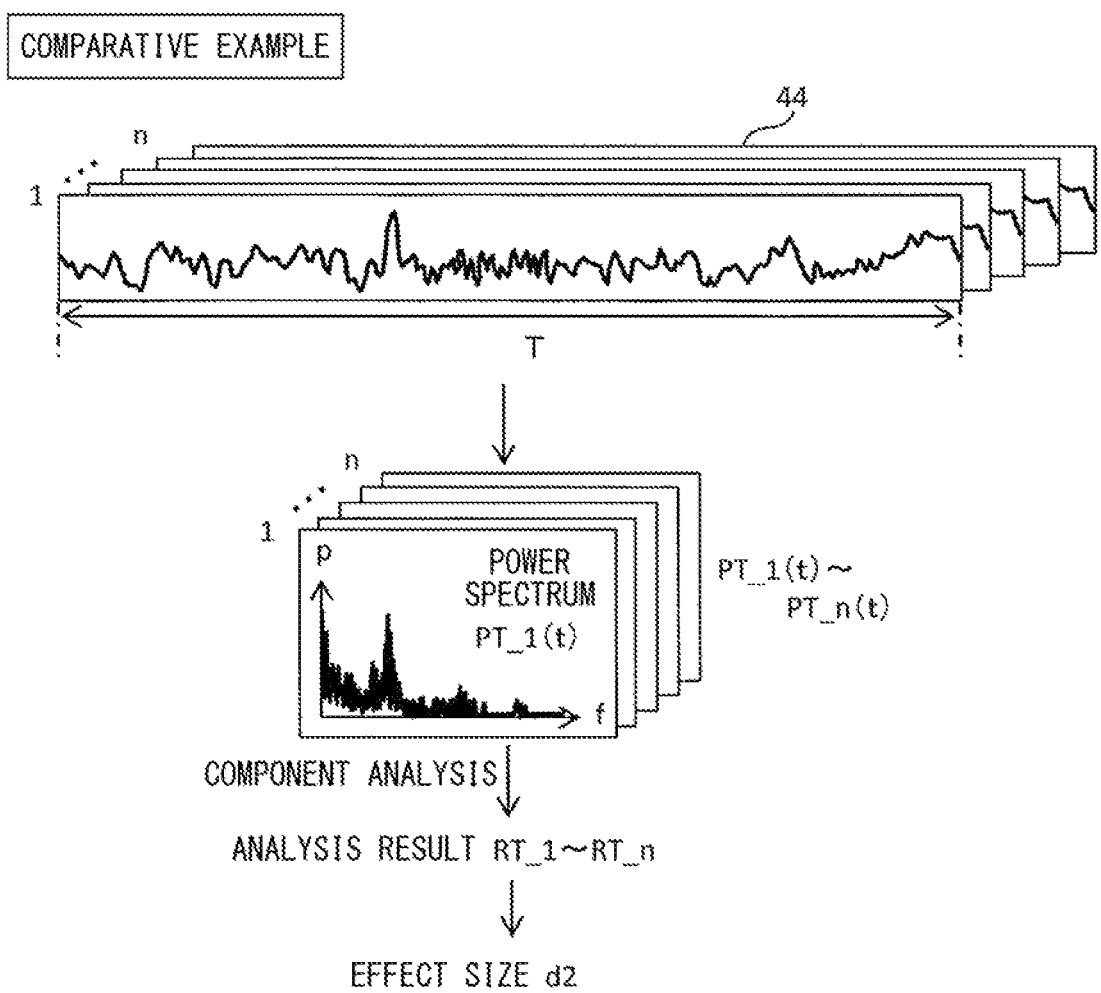

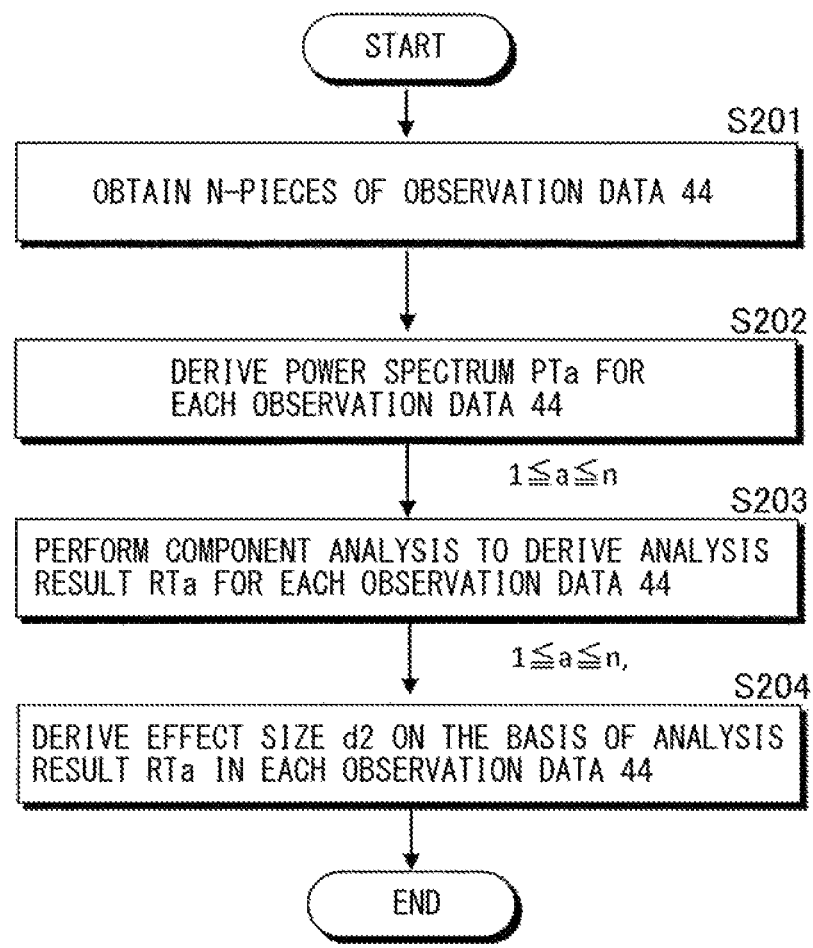
[FIG. 5]

[FIG. 6]
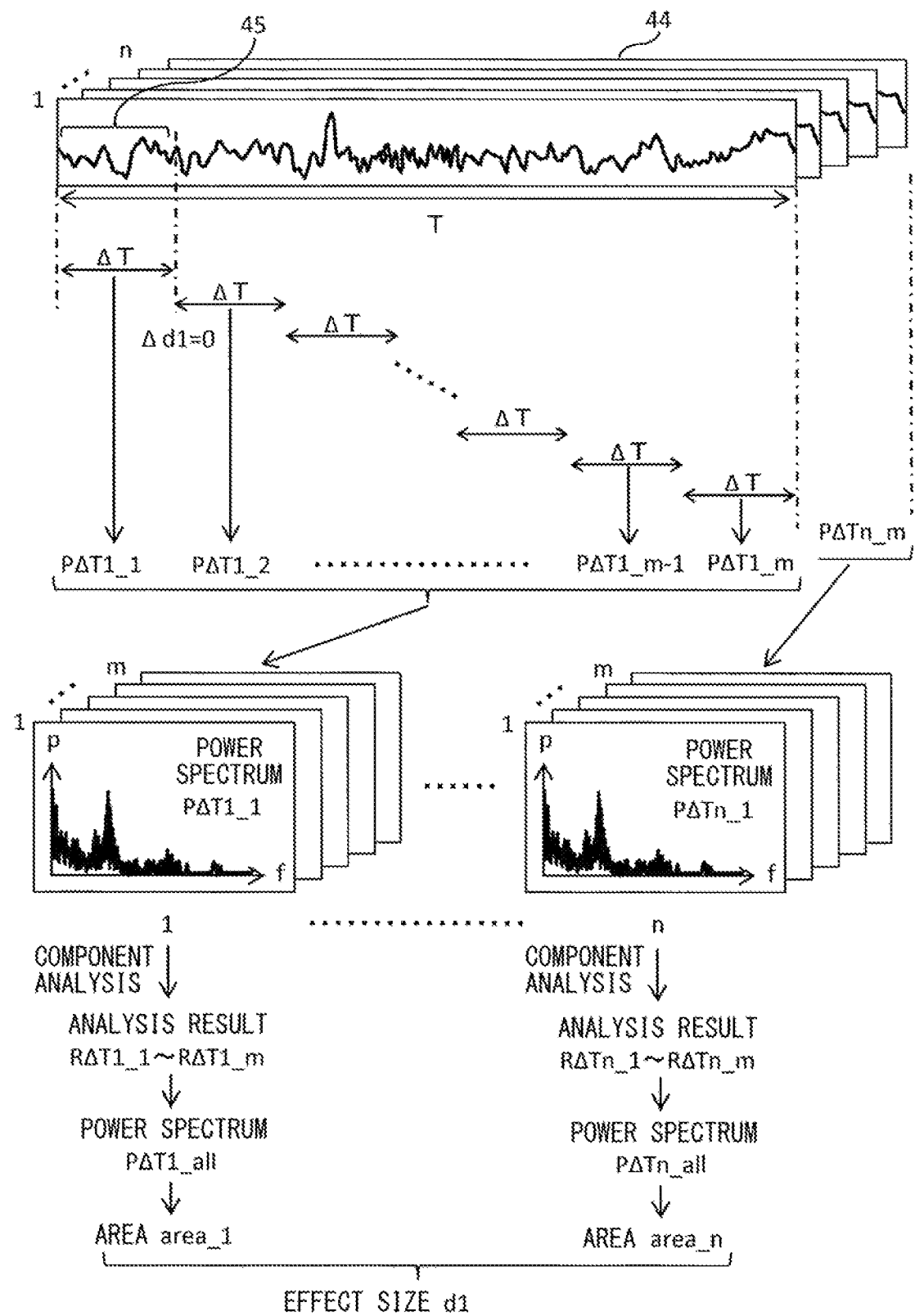

[FIG. 7]
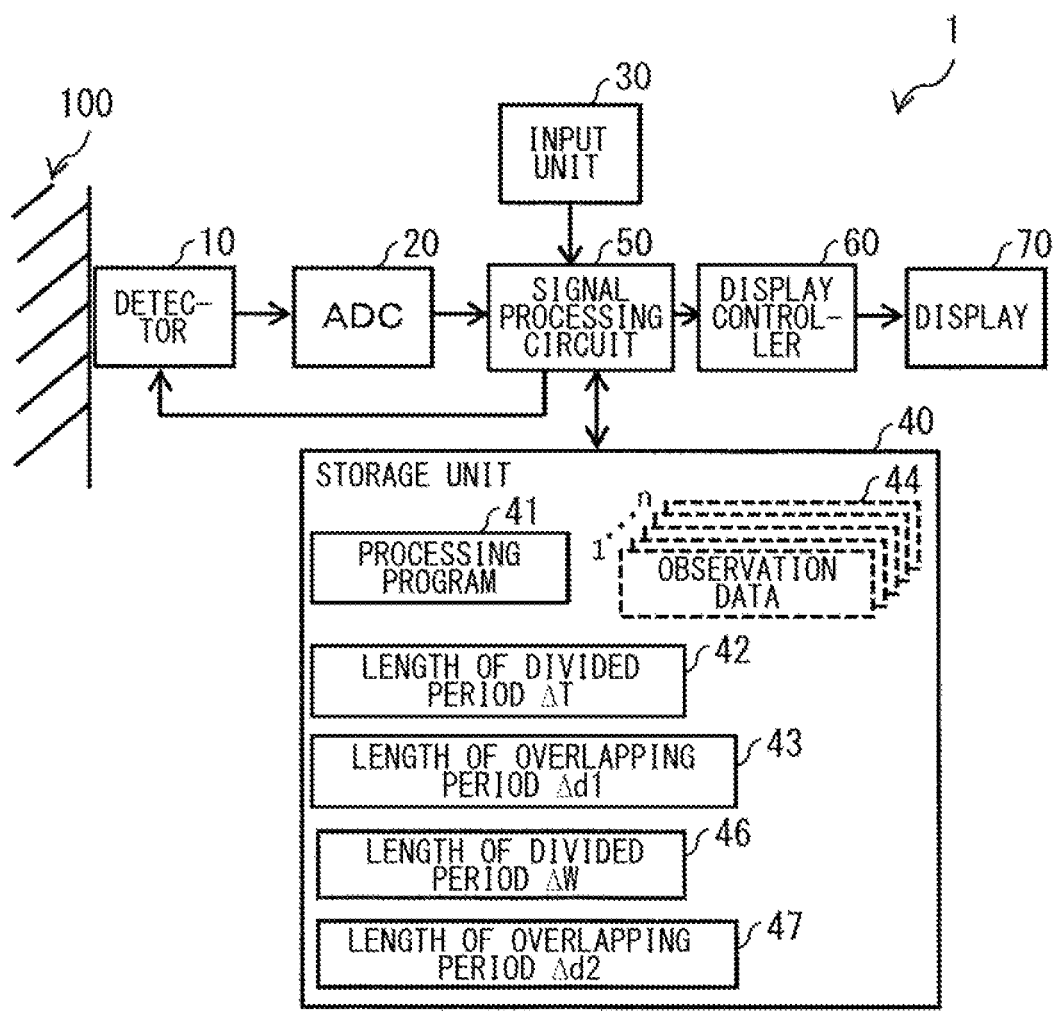

[FIG. 8]
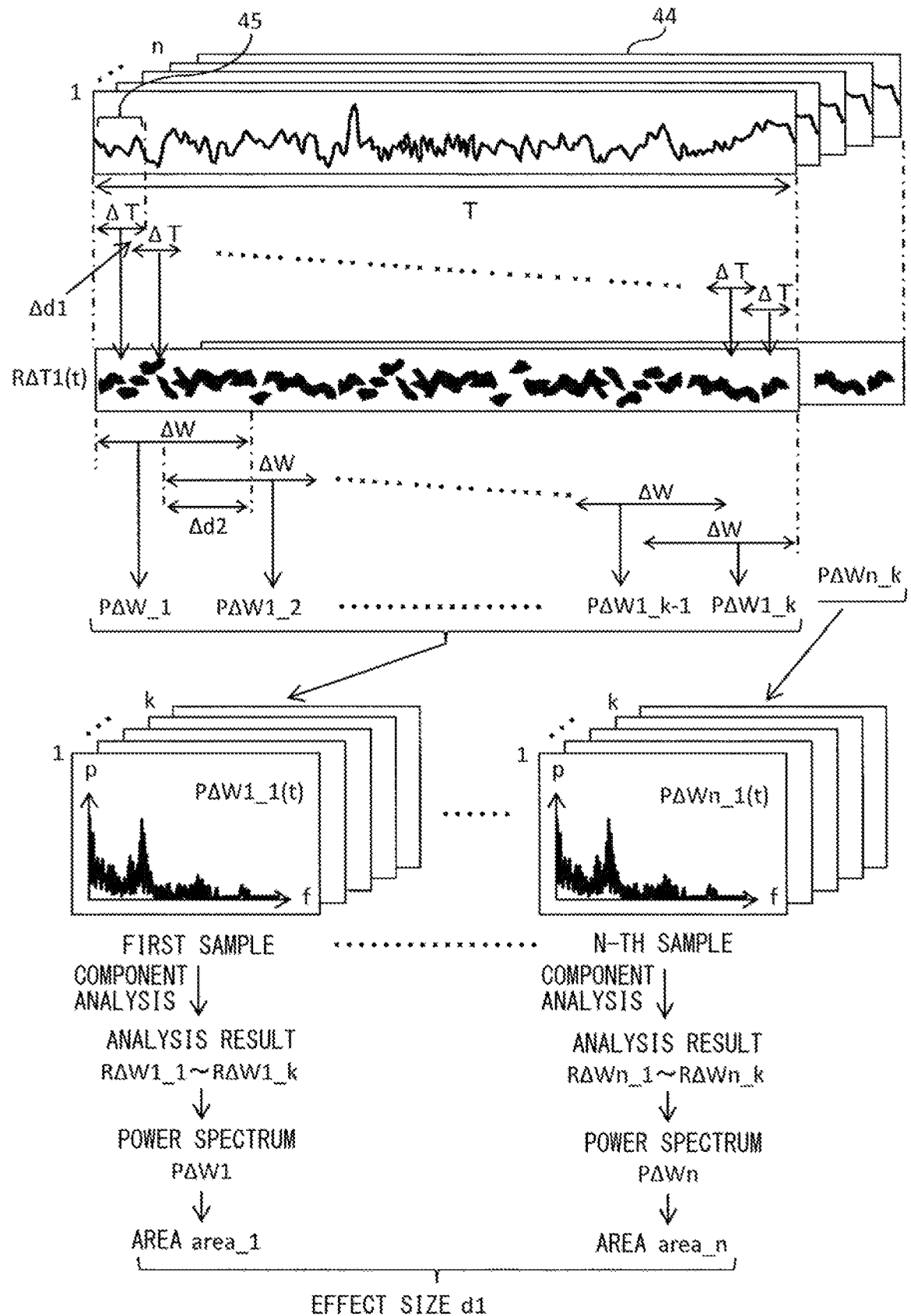

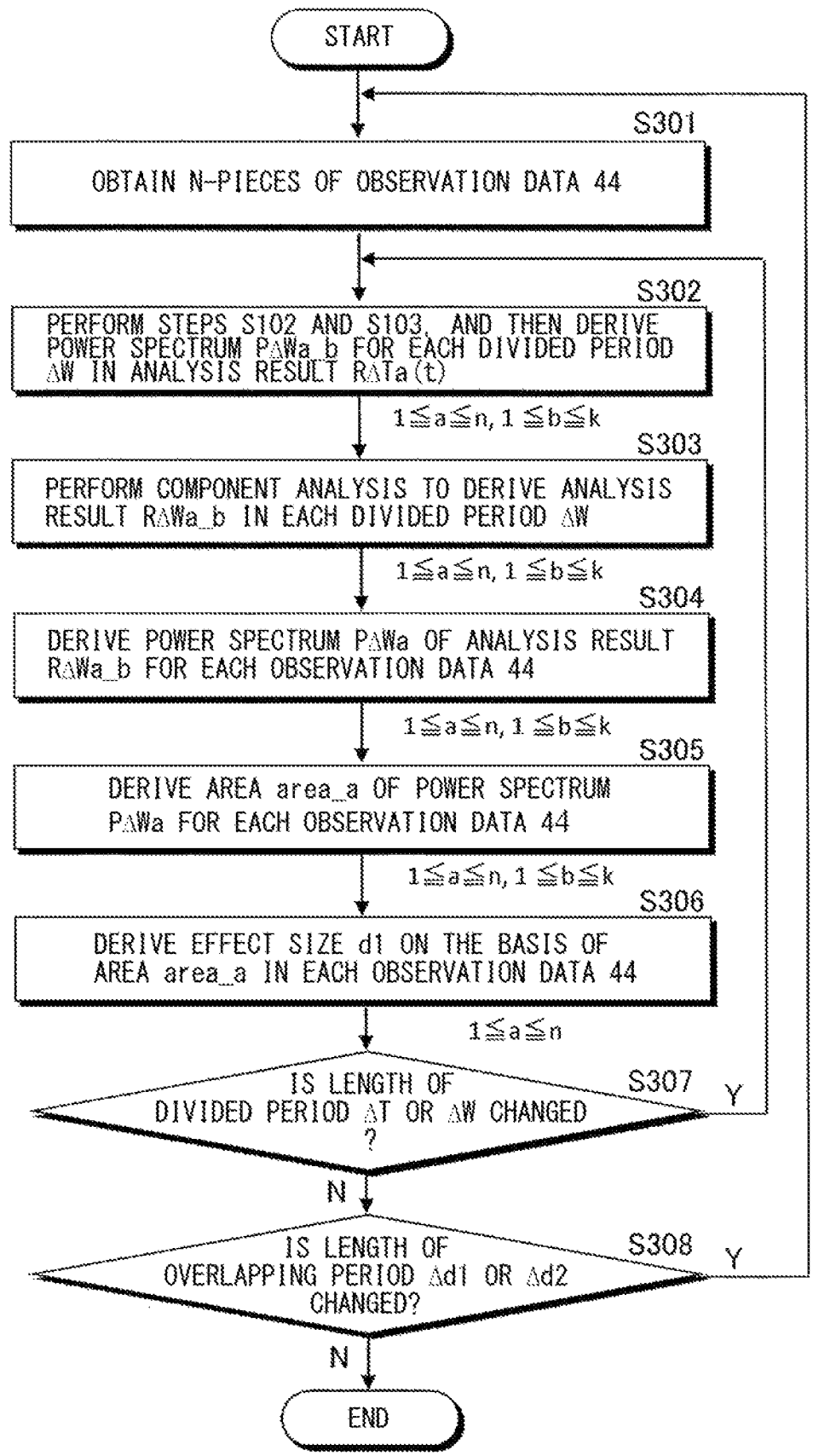
[FIG. 9]

[FIG. 10]
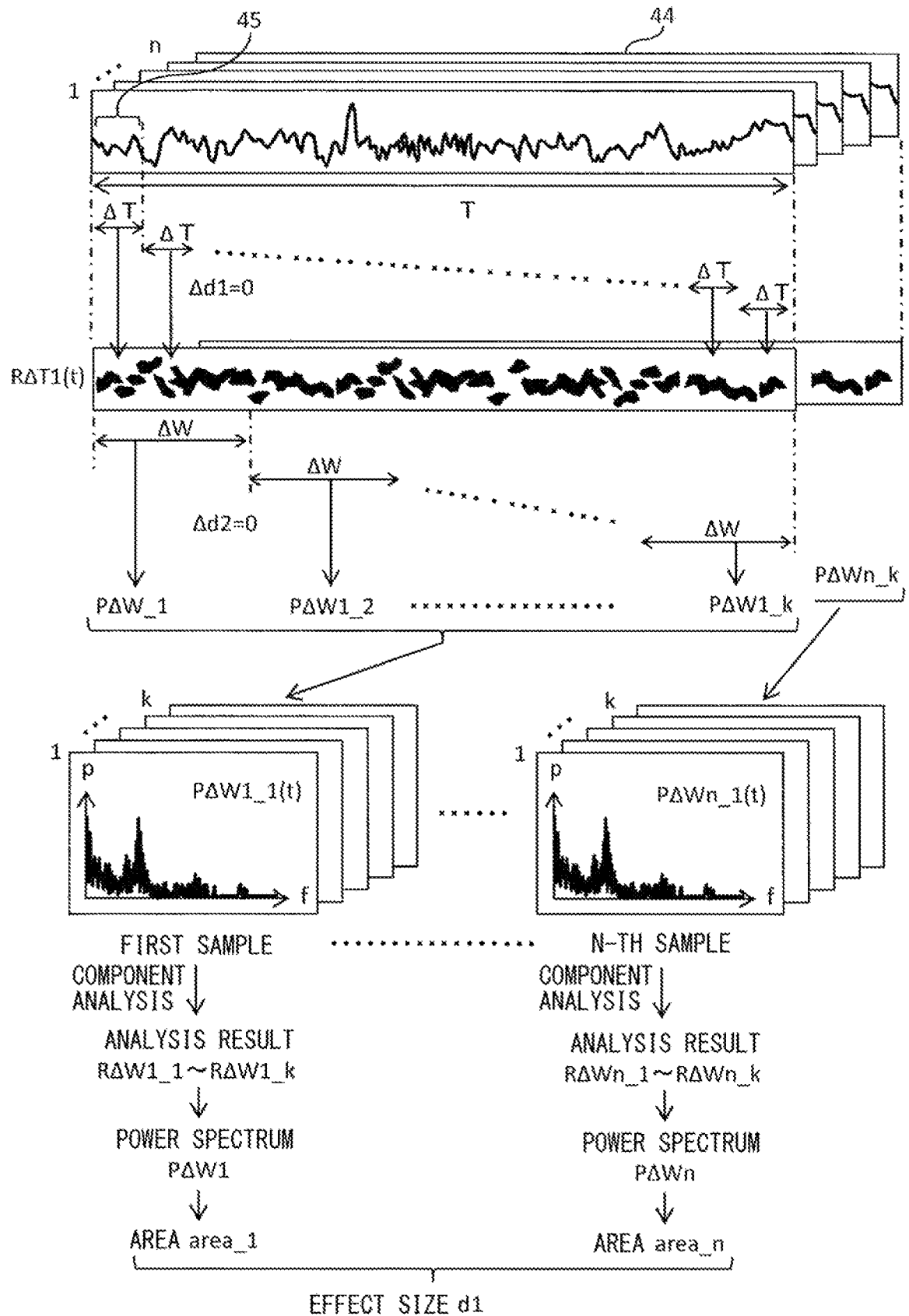

[FIG. 11]
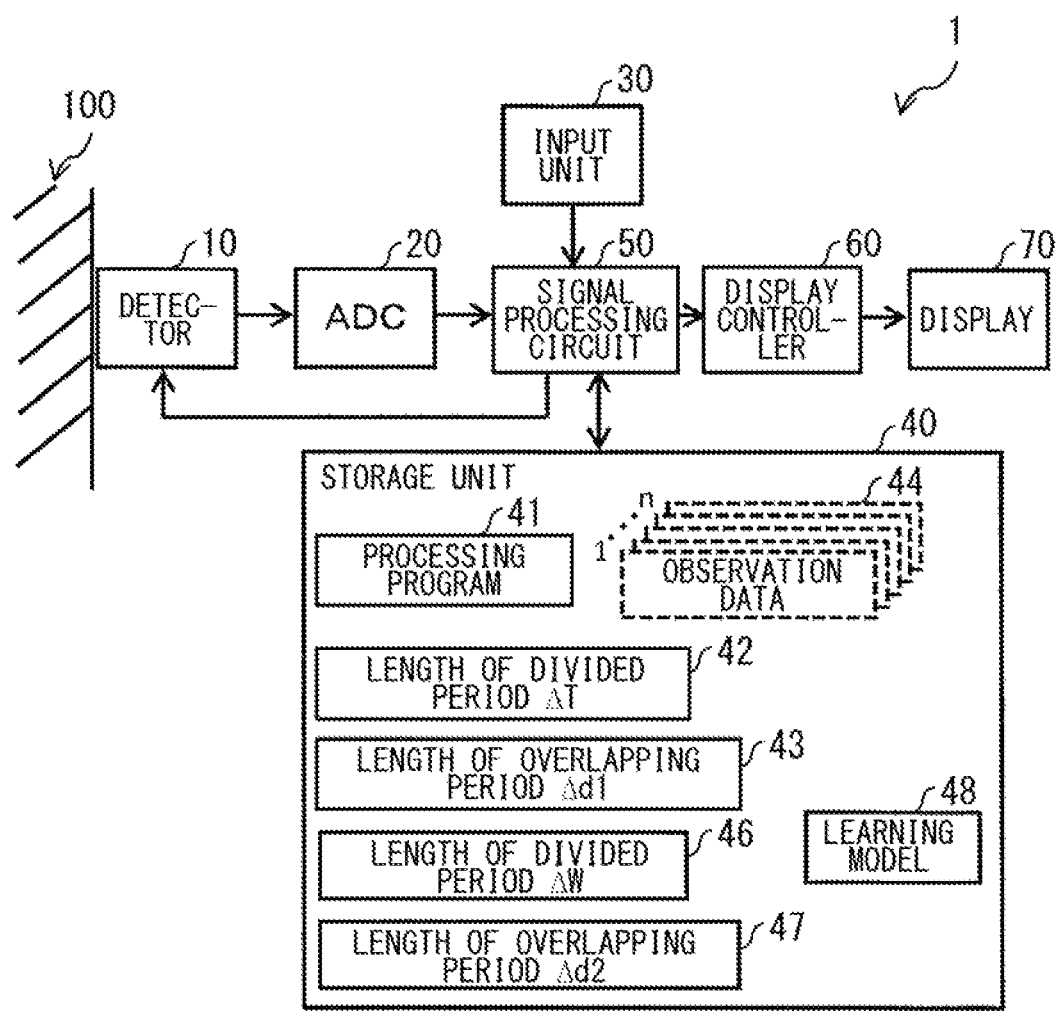

[ FIG. 12 ]
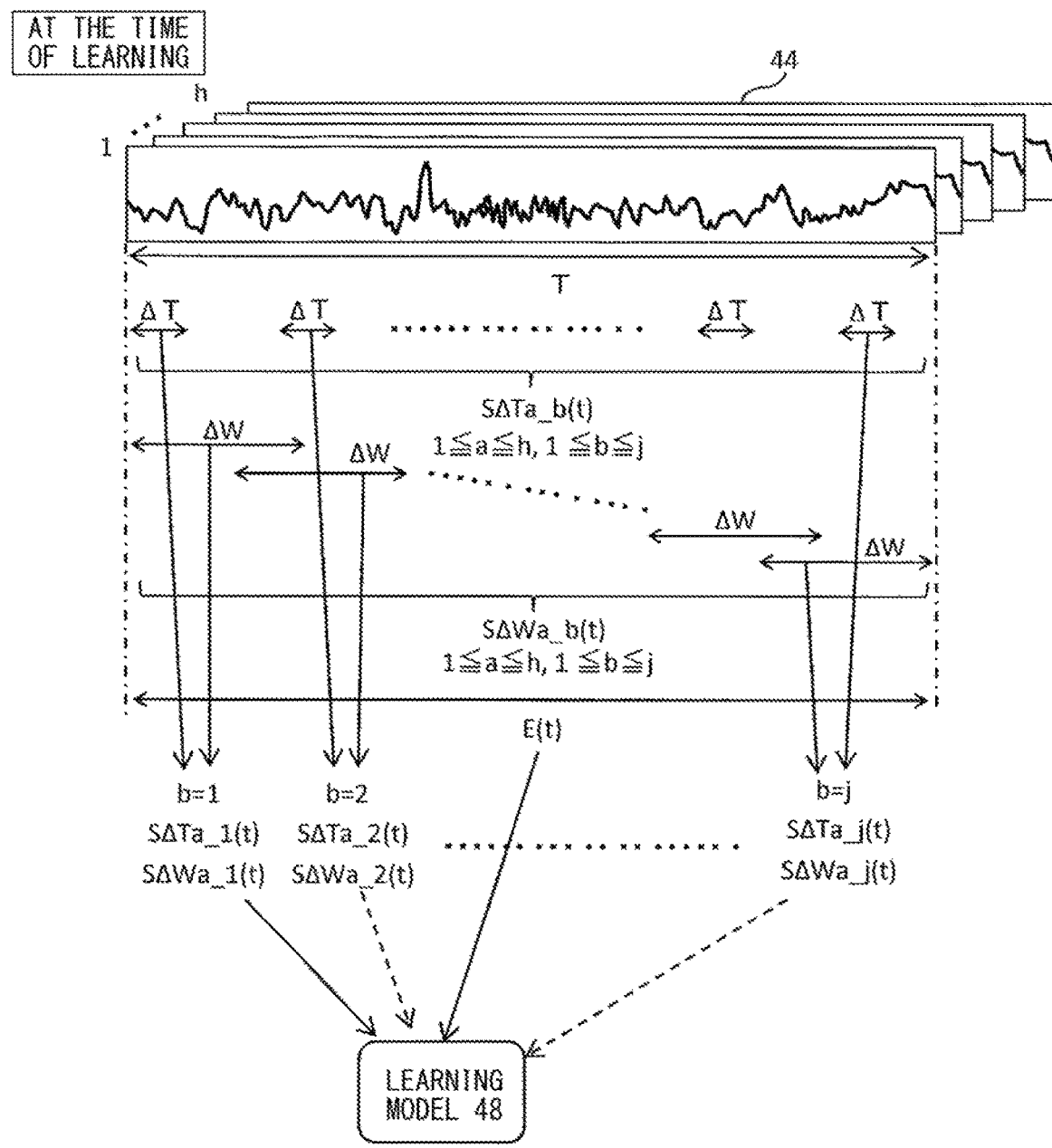

[FIG. 13]
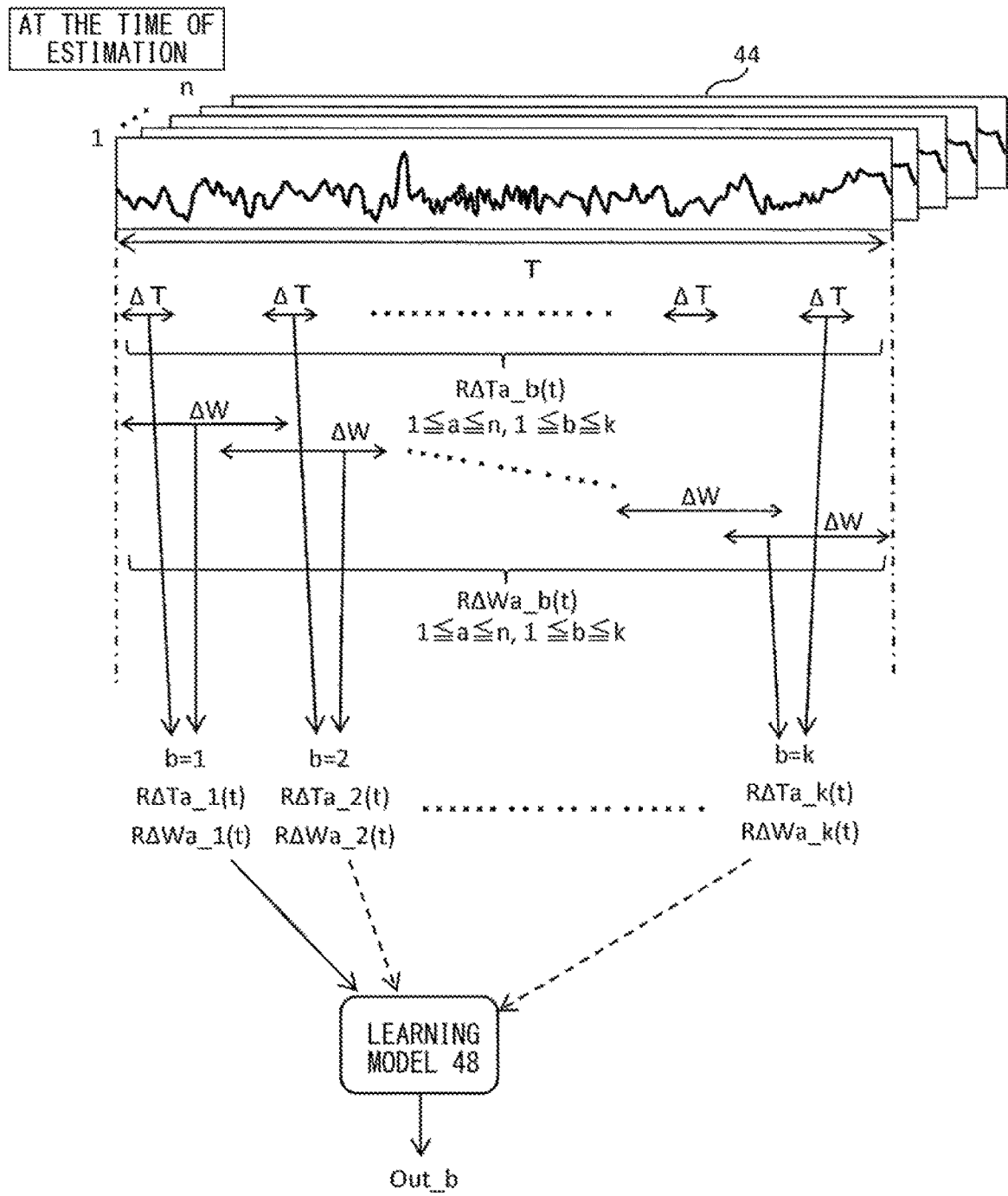

[ FIG. 14 ]
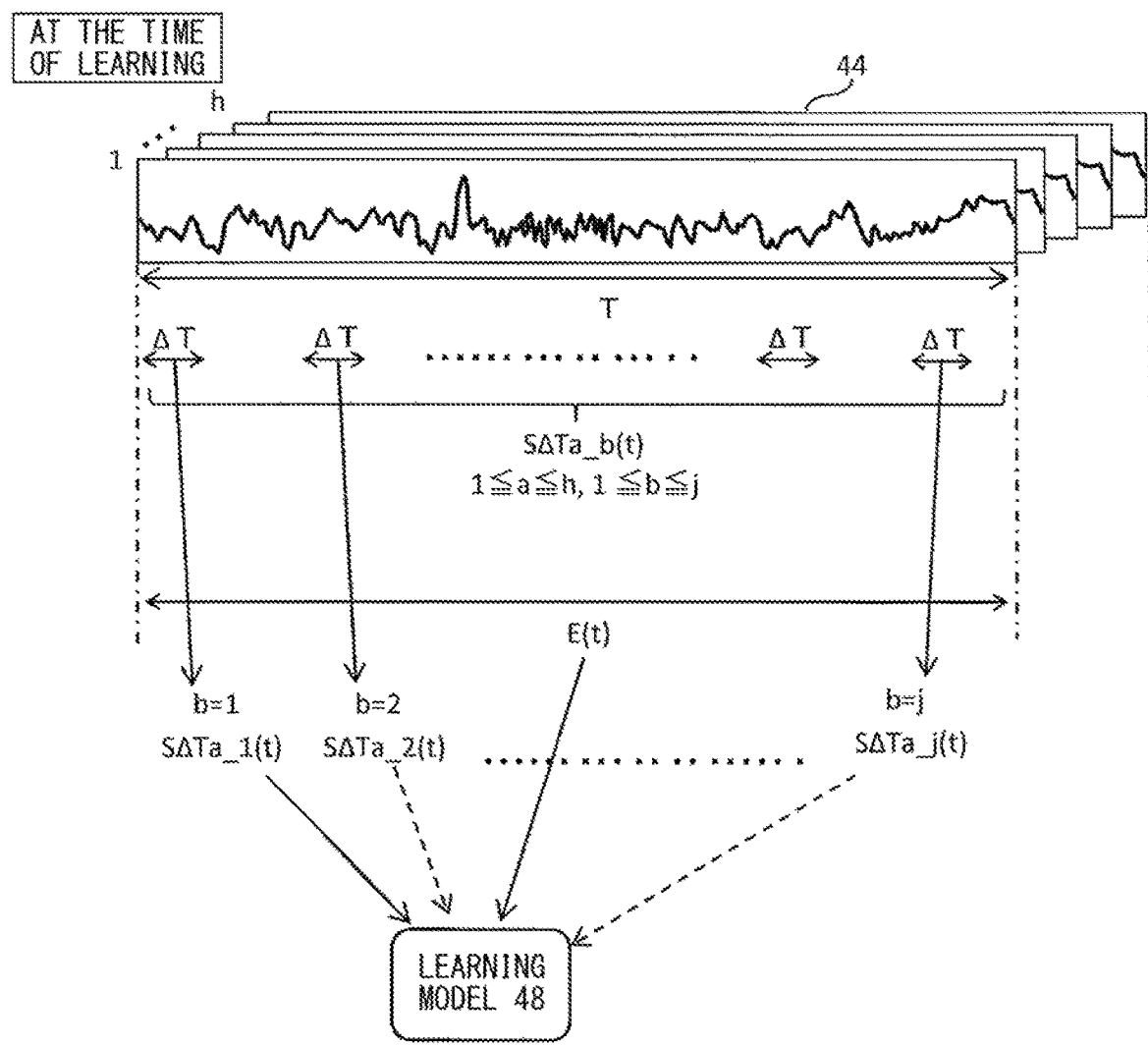

[FIG. 15]
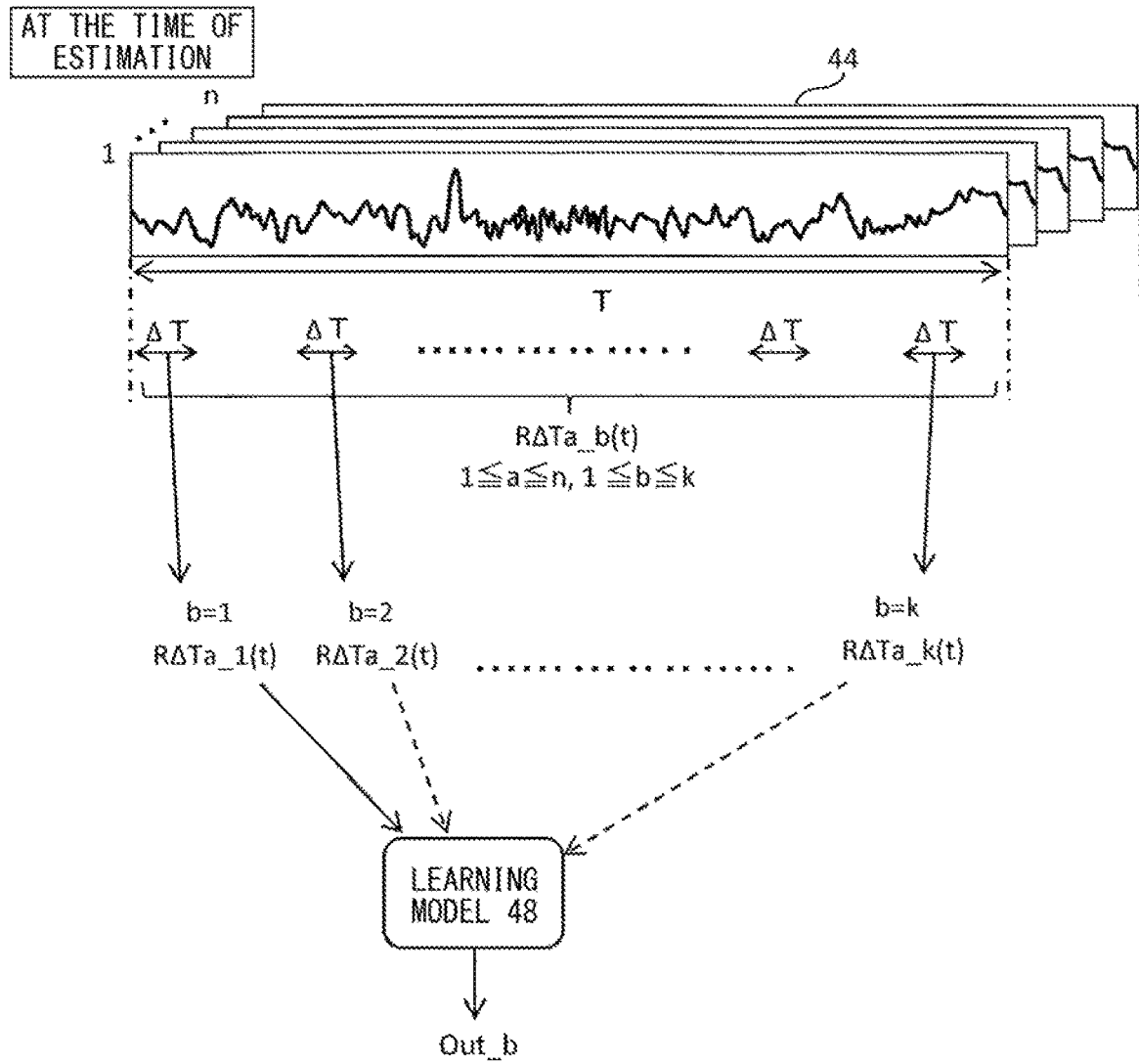
[FIG. 16]
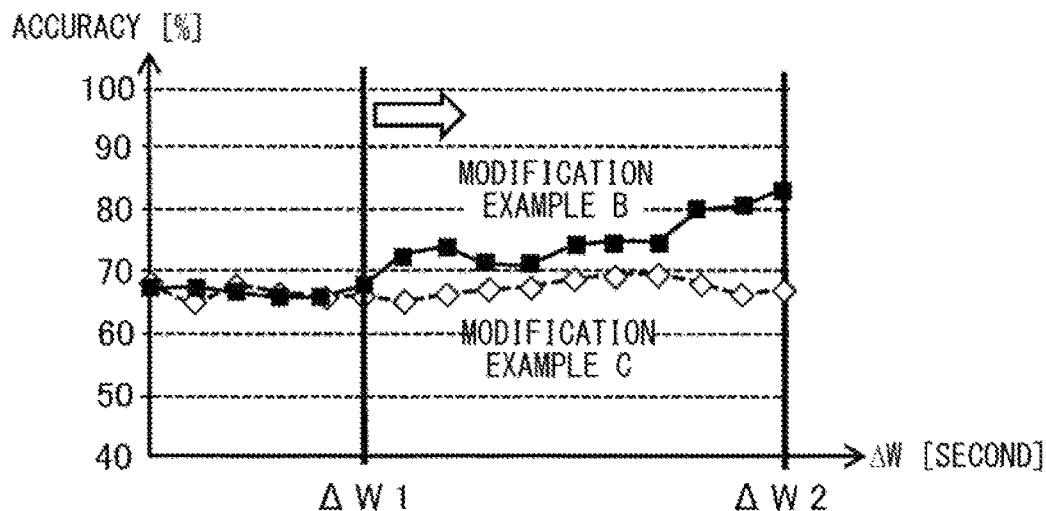

[ FIG. 17 ]
| MODEL | ACCURACY OF ESTIMATION |
|---|---|
| MODEL OF MODIFICATION EXAMPLE B | 67.1% |
| MODEL OF MODIFICATION EXAMPLE C | 83.3% |
[ FIG. 18 ]
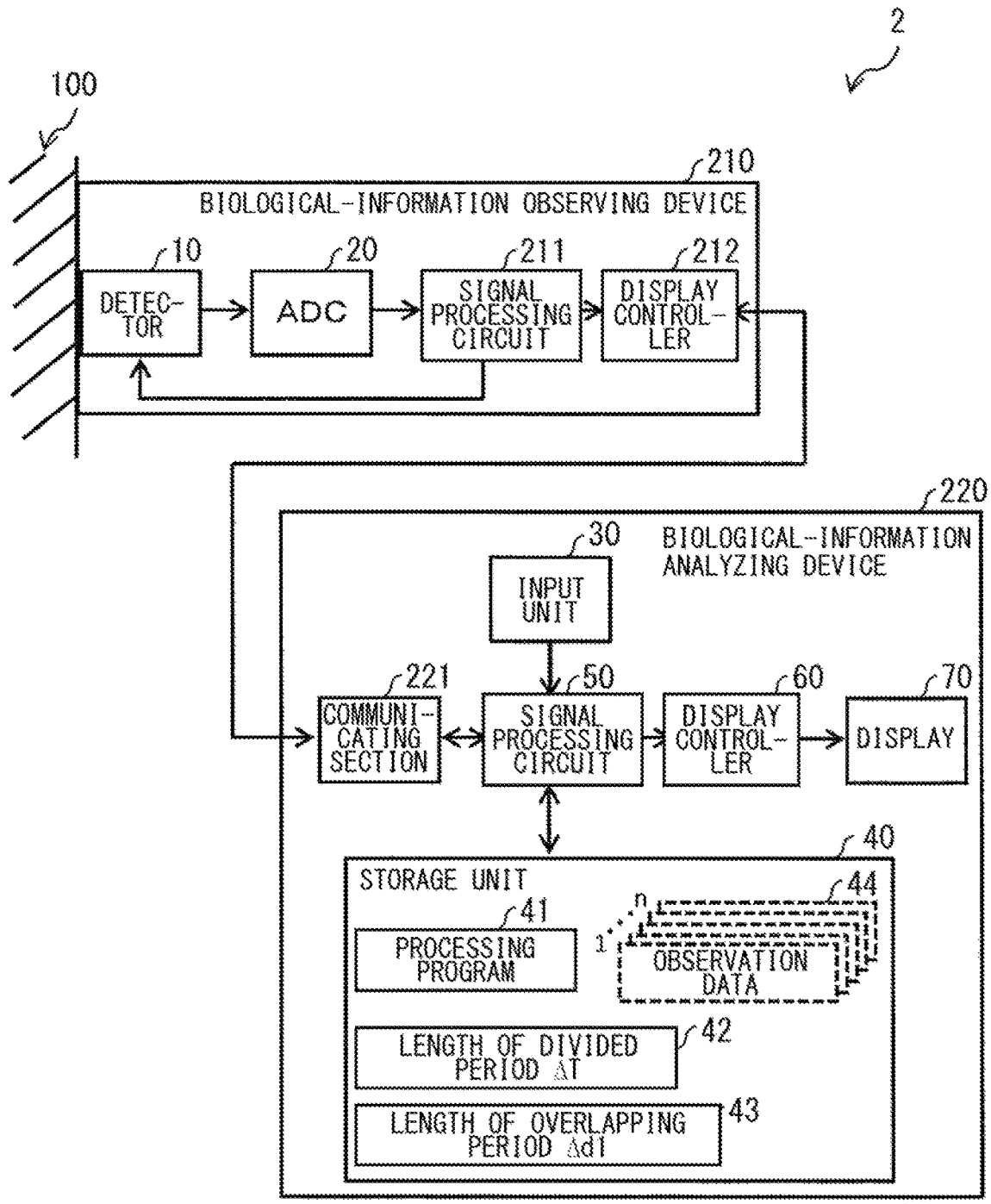

[FIG. 19]
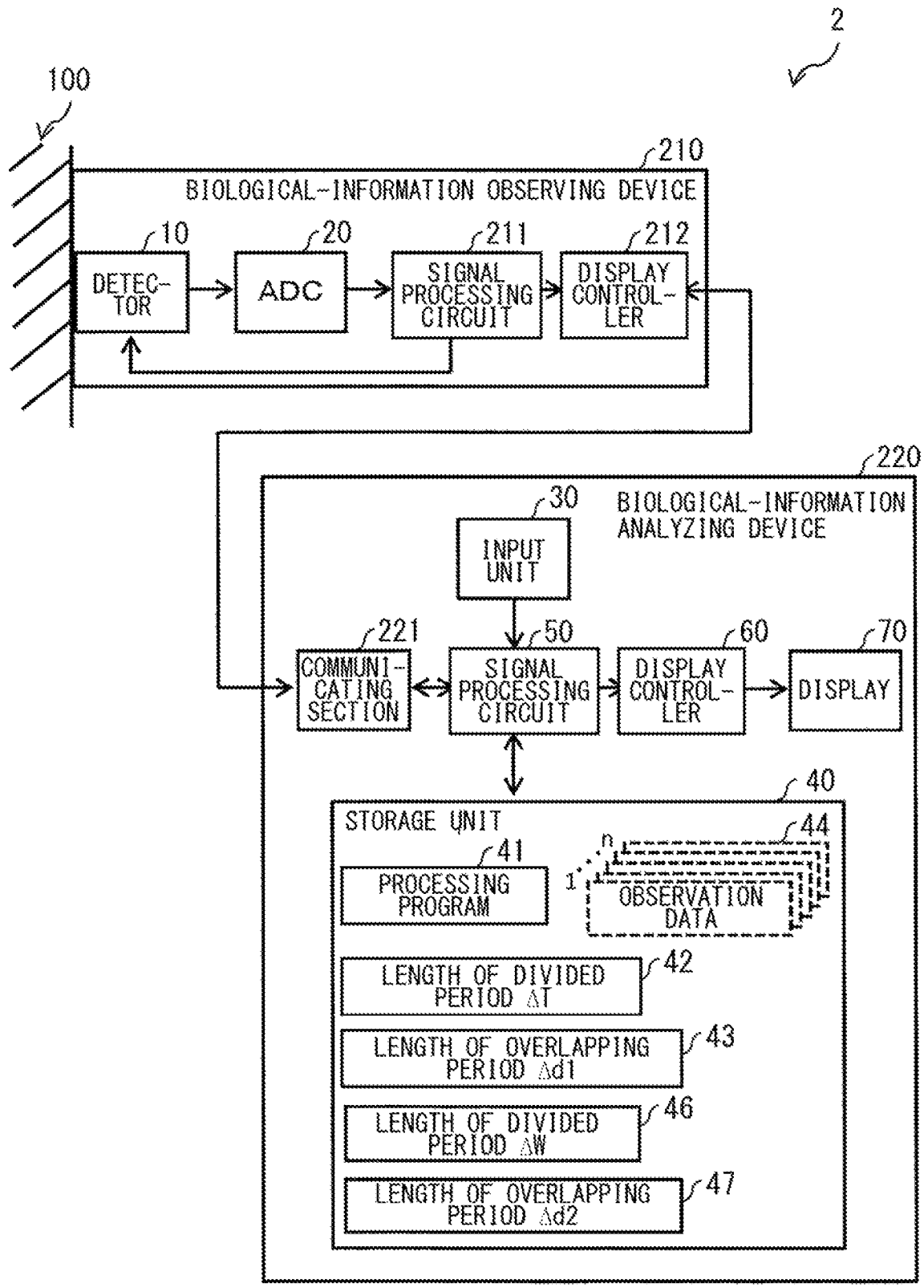

[ FIG. 20 ]
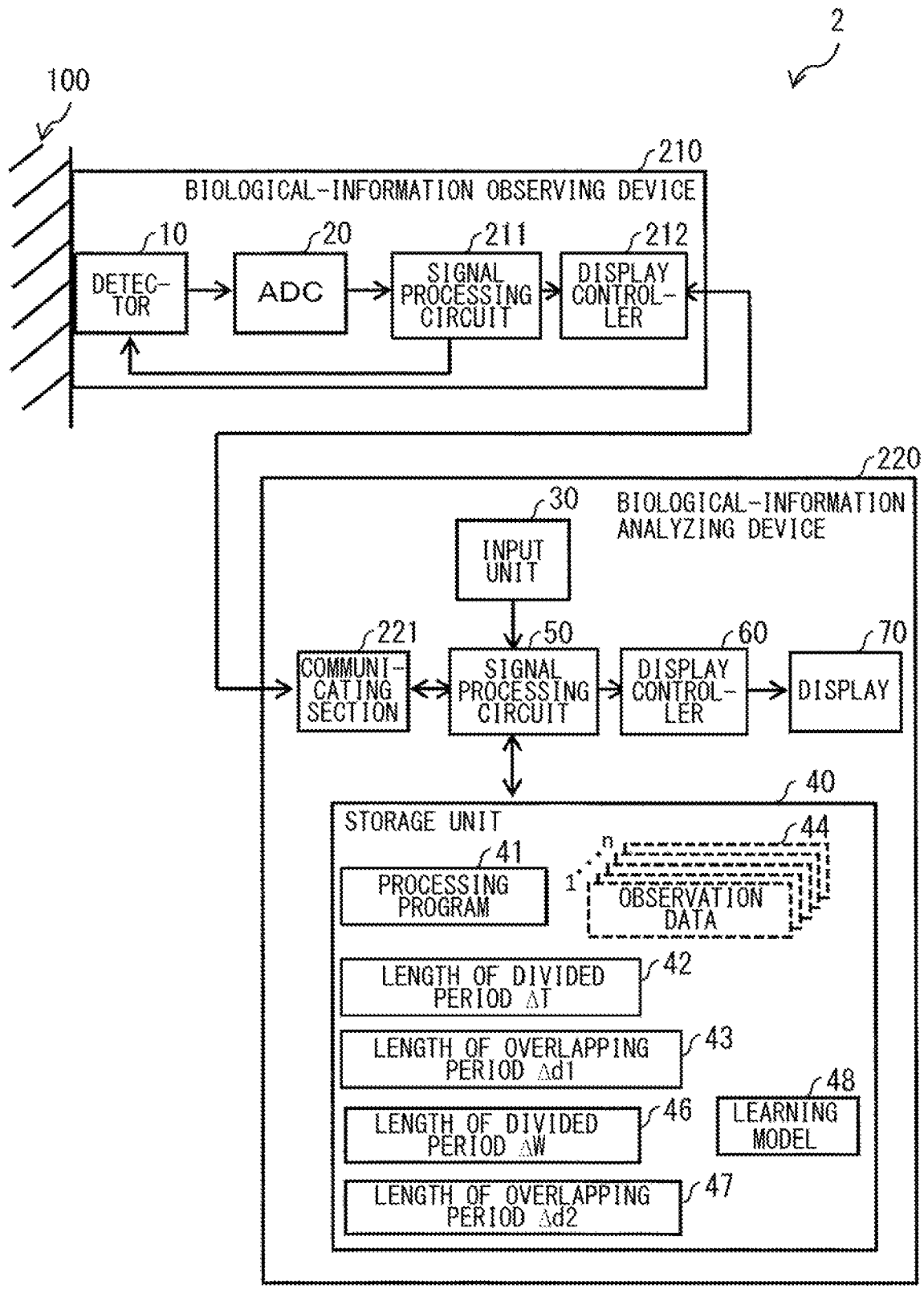

BIOLOGICAL-INFORMATION EVALUATING DEVICE AND METHOD OF EVALUATING BIOLOGICAL INFORMATION

TECHNICAL FIELD

The present disclosure relates to a biological-information evaluating device and a method of evaluating biological information.

BACKGROUND ART

Time and effort are typically necessary to establish a method of controlling a person into a desired state or to increase the number of samples in order to acquire high-quality biological information regarding a person with the aim of knowing a desired state. However, in a field of psychology, it is considered that it is necessary to collect a relatively large number of samples and also increase a measuring period in order to exhibit a difference between states (or between groups) in a significant manner (see, for example, Non-Patent Literature 1). In addition to a human, the target from which the biological information is acquired may include an animal or the like.

CITATION LIST

Non-Patent Literature

Non-Patent Literature 1: Eur Child Adolesc Psychiatry (2017) 26: 1511-1522

SUMMARY OF THE INVENTION

Thus, it is extremely difficult to establish a technology that satisfies application needs of knowing a difference between states. It is desirable to provide a biological-information evaluating device and a method of evaluating biological information, which make it possible to know a difference between states with a small number of samples and a short measuring period.

A biological-information evaluating device according to an embodiment of the present disclosure includes a signal processing circuit that generates a feature value of an observation target waveform for each of pieces of observation data obtained through observation of a living body for a predetermined period, on a basis of a plurality of pieces of partial observation data contained in each of the pieces of observation data and each having an observation period shorter than an observation period of the observation data.

A method of evaluating biological information according to an embodiment of the present disclosure uses a signal processing circuit to perform a signal process including generating a feature value of an observation target waveform for each of pieces of observation data obtained through observation of a living body for a predetermined period, on a basis of a plurality of pieces of partial observation data contained in each of the pieces of observation data and each having an observation period shorter than an observation period of the observation data.

In the biological-information evaluating device and the method of evaluating biological information according to the embodiment of the present disclosure, the feature value of the observation target waveform is generated for each of pieces of observation data on the basis of the plurality of pieces of partial observation data contained in each of the pieces of observation data. This makes it possible to exhibit a difference between states in a robust manner.

The biological-information evaluating device and the method of evaluating biological information according to the embodiment of the present disclosure make full use of biological information in which periodic variation is able to be seen, which makes it possible to know a difference between states with a small number of samples and a short measuring period. It should be noted that the effects described in the present disclosure are not necessarily limited to those described here. Any effects described in the present description may be taken.

BRIEF DESCRIPTION OF THE DRAWINGS

FIG. 1 is a diagram illustrating one example of a schematic configuration of a biological-information evaluating device according to a first embodiment of the present disclosure.

FIG. 2 is a schematic diagram of an example of a procedure of calculating a feature value and an evaluation value in the biological-information evaluating device in FIG. 1.

FIG. 3 is a flowchart of an example of a procedure of calculating a feature value and an evaluation value in the biological-information evaluating device in FIG. 1.

FIG. 4 is a schematic diagram of an example of a procedure of calculating a feature value and an evaluation value according to a comparative example.

FIG. 5 is a flowchart of an example of a procedure of calculating a feature value and an evaluation value according to a comparative example.

FIG. 6 is a schematic diagram of a modification example of the calculating procedure in FIG. 3.

FIG. 7 is a diagram illustrating a modification example of a schematic configuration of the biological-information evaluating device in FIG. 1.

FIG. 8 is a schematic diagram of an example of a procedure of calculating a feature value and an evaluation value in the biological-information evaluating device in FIG. 7.

FIG. 9 is a flowchart of an example of a procedure of calculating a feature value and an evaluation value in the biological-information evaluating device in FIG. 7.

FIG. 10 is a schematic diagram of a modification example of a procedure of calculating a feature value and an evaluation value in the biological-information evaluating device in FIG. 7.

FIG. 11 is a diagram illustrating a modification example of a schematic configuration of the biological-information evaluating device in FIG. 1.

FIG. 12 is a schematic diagram of an example of a learning procedure for a learning model in the biological-information evaluating device in FIG. 11.

FIG. 13 is a schematic diagram of an example of a procedure of estimating a state using a learning model in the biological-information evaluating device in FIG. 11.

FIG. 14 is a schematic diagram of a modification example of a learning procedure for a learning model in the biological-information evaluating device in FIG. 11.

FIG. 15 is a schematic diagram of a modification example of a procedure of estimating a state using a learning model in the biological-information evaluating device in FIG. 11.

FIG. 16 is a diagram illustrating an example of a relationship between a length of a divided period $\Delta W$ and an accuracy of estimation.

FIG. 17 is a diagram illustrating an example of an accuracy of estimation in a case where the length of divided period ΔW is ΔW2 in FIG. 16.

FIG. 18 is a diagram illustrating an example of a schematic configuration of a biological-information evaluating device according to a second embodiment of the present disclosure.

FIG. 19 is a diagram illustrating a modification example of a schematic configuration of the biological-information evaluating device in FIG. 18.

FIG. 20 is a diagram illustrating a modification example of a schematic configuration of the biological-information evaluating device in FIG. 18.

MODES FOR CARRYING OUT THE INVENTION

Below, a mode for carrying out the present disclosure will be described in detail with reference to the drawings. Note that description will be given in the following order.
1. First Embodiment
2. Modification Example of First Embodiment
3. Second Embodiment

1. First Embodiment

[Configuration]

A biological-information evaluating device 1 according to a first embodiment of the present disclosure will be described. FIG. 1 is a diagram illustrating an example of a schematic configuration of the biological-information evaluating device 1. The biological-information evaluating device 1 is a device that detects biological information regarding a living body 100. In addition, the biological-information evaluating device 1 is a device that generates a feature value of an observation target waveform contained in the detected biological information, and also generates an evaluation value concerning a difference in observation target waveform between pieces of detected biological information, on the basis of the generated feature value. The biological information includes, for example, brainwaves, pulses, and sweating. The living body 100 is typically a human, and may be an animal. The biological-information evaluating device 1 is, for example, a wearable device such as a head-mounted display.

The biological-information evaluating device 1 includes, for example, a detector 10, an ADC (Analog-Digital Converter), an input unit 30, a storage unit 40, a signal processing circuit 50, a display controller 60, and a display 70.

The detector 10 detects biological information regarding the living body 100, and outputs the detected biological information as an analog signal to the ADC 20. The detector 10 obtains analog observation data 44 through observation of the living body for a predetermined period (observation period T that will be described later), and outputs the obtained observation data 44 to the ADC 20. The detector 10 includes, for example, a pair of electrodes that are brought into contact with the living body 100, and a detecting circuit that outputs an analog signal that corresponds to a potential difference across the pair of electrodes. Note that the detector 10 may include, for example, a light source that outputs light onto the living body 100, and a light receiving circuit that detects light reflected and/or scattering within the living body 100, out of light outputted from the light source, and outputs an analog signal that corresponds to the detected light.

The ADC 20 converts the analog observation data 44 (analog signal) inputted from the detector 10, into a digital signal, and outputs the digital observation data 44 (digital signal) obtained through the conversion, to the signal processing circuit 50. The input unit 30 includes a device that allows a user to perform input operation, and includes, for example, a touch screen, a button, a microphone, a switch, and a lever. For example, the input unit 30 receives input of a setting value 42, which will be described later.

The storage unit 40 holds a program (for example, a processing program 41) that the signal processing circuit 50 executes, a length 42 of a divided period ΔT, and a length 43 of an overlapping period Δd1. The processing program 41 is a program that obtains the observation data 44 from the detector 10, or that performs a predetermined signal process on the obtained observation data 44. Here, the "predetermined process" includes, for example, a process of generating, for each piece of observation data 44, a feature value of an observation target waveform on the basis of the obtained observation data 44, and using the feature value for each of the pieces of observation data 44 to generate an evaluation value as to a difference in the observation target waveform between the pieces of observation data 44. The length 42 of the divided period ΔT includes a default value. The length 43 of the overlapping period Δd1 includes a default value.

The storage unit 40 holds the data inputted from the input unit 30 into the signal processing circuit 50. For example, the storage unit 40 holds a setting value of a length of the divided period ΔT inputted from the input unit 30, and a setting value of a length of the overlapping period Δd1 inputted from the input unit 30. Note that, in the storage unit 40, the setting value of the divided period ΔT inputted from the input unit 30 is included in the length 42 of the divided period ΔT. In addition, in the storage unit 40, the setting value of the overlapping period Δd1 inputted from the input unit 30 is included in the length 43 of the overlapping period Δd1.

The storage unit 40 further holds data inputted from the detector 10 through the ADC 20 into the signal processing circuit 50. For example, the storage unit 40 holds digital observation data 44 inputted from the detector 10 through the ADC 20. For example, the storage unit 40 holds n-pieces of observation data 44 as illustrated in FIG. 1.

The signal processing circuit 50 includes a processor, and executes a program (for example, the processing program 41) held in the storage unit 40. For example, the processing program 41 is loaded into the signal processing circuit 50 to generate a feature value of an observation target waveform for each piece of observation data 44 on the basis of the observation data 44, and also generate an evaluation value concerning a difference in observation target waveform between pieces of observation data 44, on the basis of the feature value for each of the pieces of observation data 44.

The display controller 60 is a controller that controls displaying of the display 70. The display controller 60 generates an image signal used to display an image containing the evaluation value inputted from the signal processing circuit 50, and outputs it to the display 70. The display 70 displays an image corresponding to the image signal inputted from the display controller 60. The display 70 includes, for example, a liquid crystal panel and an organic EL (Electro Luminescence) panel.

Next, generation of the feature value described above and the evaluation value described above will be described. Note that, in the description below, an area area_a (the "a" at the end represents an integer within a range of 1 to n inclusive), which will be described later, is given as an example of the feature value described above. In addition, in the description below, an effect size d1, which will be described later, is given as an example of the evaluation value described above.

FIG. 2 is a diagram schematically illustrating an example of a procedure of calculating the feature value described above and the evaluation value described above in the biological-information evaluating device 1. FIG. 3 is a flowchart of an example of a procedure of calculating the feature value described above and the evaluation value described above in the biological-information evaluating device 1. Note that the calculating procedure in FIG. 2 is referred to as Example 1.

First, the signal processing circuit 50 gives the detector 10 an instruction to obtain biological information for a predetermined period (observation period T). Then, the detector 10 obtains analog biological information (observation data 44) for the predetermined period (observation period T) from the living body 100, and outputs the obtained analog observation data 44 to the ADC 20. The ADC 20 converts the analog observation data 44 (analog signal) inputted from the detector 10 into a digital signal, and outputs the digital observation data 44 (digital signal) obtained through the conversion, to the signal processing circuit 50. The signal processing circuit 50 stores the digital observation data 44 inputted from the ADC 20, in the storage unit 40. The signal processing circuit 50 repeats this procedure to store n-pieces of observation data 44 in the storage unit 40. At this time, the n-pieces of observation data 44 may be, for example, data obtained from the same person, or may be individual data obtained from n persons.

Next, the signal processing circuit 50 obtains n-pieces of observation data 44 (samples) from the storage unit 40 (step S101). The signal processing circuit 50 generates a feature value (area area_a) of an observation target waveform for each of the obtained observation data 44, on the basis of a plurality of pieces of partial observation data 45 having an observation period (divided period $\Delta T$) shorter than the observation period T of the observation data 44, the plurality of pieces of partial observation data 45 being contained in each of the obtained observation data 44.

Specifically, the signal processing circuit 50 first derives a power spectrum P$\Delta$Ta_b(t) ($1 \leq a \leq n$, $1 \leq b \leq m$) for each divided period $\Delta T$ in each of the pieces of observation data 44 (step S102). For example, the signal processing circuit 50 applies FFT (Fast Fourier Transform) to partial observation data 45 for each divided period $\Delta T$ in each of the pieces of observation data 44 to derive the power spectrum P$\Delta$Ta_b(t). The power spectrum P$\Delta$Ta_b(t) is a mathematical function of time t within the divided period $\Delta T$, and may include a frequency spectrum of an observation target waveform.

In a case where a head portion of a human serves as the living body 100, the observation target waveform includes, for example, an $\alpha$ wave, a $\beta$ wave, a $\gamma$ wave, a $\theta$ wave, a $\delta$ wave, and the like. The divided period $\Delta T$ has a minimum necessary length that allows the observation target waveform to be analyzed. In a case where a head portion of a human serves as the living body 100 and the observation target waveform is an $\alpha$ wave, the divided period $\Delta T$ falls, for example, in a range of about several seconds to several tens of seconds. For example, the signal processing circuit 50 sets, as the divided period $\Delta T$, a default value of the length 42 of the divided period $\Delta T$ held in the storage unit 40.

Furthermore, the signal processing circuit 50 sets each divided period $\Delta T$ such that an observation period (divided period $\Delta T$) of any one of the pieces of partial observation data 45 and an observation period (divided period $\Delta T$) of another piece of the pieces of partial observation data 45 partially overlap with each other. In other words, an observation period (divided period $\Delta T$) of the one of the pieces of partial observation data 45 and an observation period (divided period $\Delta T$) of another piece of the pieces of partial observation data 45 partially overlap with each other. The signal processing circuit 50 sets, for example, a default value of the length 43 of an overlapping period $\Delta$d1 held in the storage unit 40, as the partially overlapping portion (overlapping period $\Delta$d1).

Next, the signal processing circuit 50 performs component analysis to derive an analysis result R$\Delta$Ta_b ($1 \leq a \leq n$, $1 \leq b \leq m$) in each of the divided periods $\Delta T$ (step S103). For example, the signal processing circuit 50 derives an area fc(t) of a frequency band of an observation target waveform contained in each of the power spectrums P$\Delta$Ta_b(t), and sets the derived area fc(t) as the analysis result R$\Delta$Ta_b. In a case where the observation target waveform is an $\alpha$ wave, the signal processing circuit 50 derives, for example, an area of a frequency band of the $\alpha$ wave at each of the power spectrums P$\Delta$Ta_b(t). Note that, although the frequency band of the $\alpha$ wave typically falls in a range of 8 Hz to 13 Hz, the frequency band is not limited to this frequency band at the time of deriving the area fc(t). Next, the signal processing circuit 50 derives the power spectrum P$\Delta$Ta ($1 \leq a \leq n$) of the analysis result R$\Delta$Ta_b for each of the pieces of observation data 44 (step S104). For example, the signal processing circuit 50 applies FFT to the area fc(t) for each of the pieces of observation data 44 to derive the power spectrum P$\Delta$Ta.

Next, the signal processing circuit 50 derives the area area_a ($1 \leq a \leq n$) of the power spectrum P$\Delta$Ta for each of the pieces of observation data 44 (step S105). For example, the signal processing circuit 50 derives the area per unit frequency of the power spectrum P$\Delta$Ta for each of the pieces of observation data 44 and also derives the average value of these areas to set the derived area per unit frequency and the derived average value as the area area_a. Next, the signal processing circuit 50 derives an effect size d1 on the basis of the area area_a in each of the pieces of observation data 44. For example, the signal processing circuit 50 assigns the area area_a in each of the pieces of observation data 44 to the expressions (1) to (4) described below to derive the effect size d1. Here, the "average value" in the expression (1) represents, for example, an average value contained in the area area_a. In addition, the "individual numerical value" in the expressions (3) and (4) represents, for example, an area per unit frequency contained in the area area_a.

[Expression 1]

$$d = \frac{\bar{x}_1 - \bar{x}_2}{s} \quad (1)$$

$\bar{x}_1$: average value of a certain sample
$\bar{x}_2$: average value of another sample
s: pooled standard deviation with two samples

[Expression 2]

$$s = \sqrt{\frac{(n_1-1)s_1^2 + (n_2-1)s_2^2}{n_1 + n_2 - 2}} \quad (2)$$

$n_1$: total number of data in a certain sample
$n_2$: total number of data in another sample
$s^2_1$: variance of a certain sample
$s^2_2$: variance of another sample

[Expression 3]

$$s_1^2 = \frac{1}{n_1 - 1} \sum_{i=1}^{n_1} (x_{1,i} - \bar{x}_1)^2 \quad (3)$$

$x_{1,i}$: individual numerical value in a certain sample

[Expression 4]

$$s_2^2 = \frac{1}{n_2 - 1} \sum_{i=1}^{n_2} (x_{2,i} - \bar{x}_2)^2 \quad (4)$$

$x_{2,i}$: individual numeral value in another sample

Next, the signal processing circuit 50 outputs the derived effect size d1 to the display controller 60. After this, the display controller 60 generates an image signal used to display an image containing the effect size d1, and outputs it to the display 70. The display 70 displays an image corresponding to the image signal inputted from the display controller 60. On the basis of the effect size d1 displayed on the display 70, a user judges whether or not the length of the divided period ΔT is appropriate, or whether or not the length of the overlapping period Δd1 is appropriate. Judgment as to whether or not the length of the divided period ΔT is appropriate is able to be made, for example, on the basis of whether or not the effect size d1 is maximized. Similarly, judgment as to whether or not the length of the overlapping period Δd1 is appropriate is able to be made, for example, on the basis of whether or not the effect size d1 is maximized. It is considered that a value appropriate for the length of the divided period ΔT may vary depending on individual living bodies 100. Similarly, it is considered that a value appropriate for the length of the overlapping period Δd1 may vary depending on individual living bodies 100.

In a case where the user judges that the length of the divided period ΔT is necessary to be changed, the user inputs a setting value of the length of the divided period ΔT into the input unit 30. The input unit 30 outputs, to the signal processing circuit 50, the setting value of the length of the divided period ΔT inputted by the user. The signal processing circuit 50 causes the setting value of the length of the divided period ΔT inputted from the input unit 30 to be held in the storage unit 40. In addition, in a case where the user judges that the length of the overlapping period Δd1 is necessary to be changed, the user inputs a setting value of the length of the overlapping period Δd1 into the input unit 30. The input unit 30 outputs, to the signal processing circuit 50, the setting value of the length of the overlapping period Δd1 inputted from the user. The signal processing circuit 50 causes the setting value of the length of the overlapping period Δd1 inputted from the input unit 30 to be held in the storage unit 40.

The signal processing circuit 50 judges whether or not to change the length of the divided period ΔT. In a case where a setting value of the length of the divided period ΔT is newly held in the storage unit 40, or the setting value of the length of the divided period ΔT in the storage unit 40 is updated, the signal processing circuit 50 reads out the setting value of the length of the divided period ΔT from the storage unit 40, and changes the length of the divided period ΔT on the basis of the read-out setting value (step S107: YES). The signal processing circuit 50 performs steps S101 to S106 using the divided period ΔT with the changed length. In a case where the setting value of the length of the divided period ΔT is not held in the storage unit 40, or the setting value of the length of the divided period ΔT in the storage unit 40 is not updated, the signal processing circuit 50 moves to step S108 (step S107: NO).

The signal processing circuit 50 judges whether or not to change the length of the overlapping period Δd1. In a case where a setting value of the length of the overlapping period Δd1 is newly held in the storage unit 40, or the setting value of the length of the overlapping period Δd1 in the storage unit 40 is updated, the signal processing circuit 50 reads out the setting value of the length of the overlapping period Δd1 from the storage unit 40, and changes the length of the overlapping period Δd1 on the basis of the read-out setting value (step S108: YES). The signal processing circuit 50 performs steps S101 to S107 using the overlapping period Δd1 with the changed length. In a case where the setting value of the length of the overlapping period Δd1 is not held in the storage unit 40, or the setting value of the length of the overlapping period Δd1 in the storage unit 40 is not updated, the signal processing circuit 50 ends the process.

FIG. 4 is a diagram schematically illustrating an example of a procedure of calculating the feature value described above and the evaluation value described above in a biological-information evaluating device according to a comparative example. FIG. 5 is a flowchart of an example of a procedure of calculating the feature value described above and the evaluation value described above in the biological-information evaluating device according to the comparative example.

The biological-information evaluating device (signal processing circuit) according to the comparative example obtains n-pieces of observation data 44 (samples) from the storage unit (step S201). Next, the biological-information evaluating device (signal processing circuit) according to the comparative example derives a power spectrum PTa (1≤a≤n) for each of the pieces of observation data 44 (step S202). Then, the biological-information evaluating device (signal processing circuit) according to the comparative example performs component analysis to derive an analysis result RTa (1≤a≤n) for each of the pieces of observation data 44 (step S203). For example, the biological-information evaluating device (signal processing circuit) according to the comparative example derives an area fca(t) of a frequency band of an observation target waveform contained in each of the power spectrums PTa, and also derives an average value fca_avg of the areas fca(t) to set the derived area fca(t) and the derived average value fca_avg as an analysis result RTa. Next, the signal processing circuit 50 derives an effect size d2 on the basis of the analysis result RTa in each of the pieces of observation data 44. For example, the signal processing circuit 50 assigns the analysis result RTa in each of the pieces of observation data 44 to the expression (1) to (4) described above to derive the effect size d2. Here, the "average value" in the expression (1) represents, for example, an average value fca_avg contained in the analysis result RTa. In addition, the "individual numerical value" in the expressions (3) and (4) represents, for example, an area fca(t) contained in the area area_a. In this manner, the process in the biological-information evaluating device (signal processing circuit) according to the comparative example ends.

Effect

Next, an effect of the biological-information evaluating device 1 will be described.

In a field of psychology, it is considered that it is necessary to collect a relatively large number of samples and also increase a measuring period in order to exhibit a significance of a difference between states. However, time and effort are typically necessary to establish a method of controlling a person into a desired state or to increase the number of samples in order to acquire high-quality biological information regarding a person with the aim of knowing a desired state. Thus, it is extremely difficult to establish a technology that satisfies application needs of knowing a difference between states.

In contrast, the biological-information evaluating device 1 according to the present embodiment generates a feature value (for example, area area_a) of an observation target waveform for each of pieces of observation data 44, on the basis of a plurality of pieces of partial observation data 45 contained in each of the pieces of observation data 44. This makes it possible to exhibit existence of a difference between states. Thus, it is possible to know a difference (for example, the effect size d1) between states with a small number of samples and a short measuring period.

In fact, an evaluation value (for example, the effect size d1) generated on the basis of the feature value (for example, the area area_a) for each of the pieces of observation data 44 and concerning a difference in an observation target waveform between pieces of observation data 44 is actually larger than an evaluation value (for example, the effect size d2) according to the comparative example. Thus, with the biological-information evaluating device 1 according to the present embodiment, it is possible to reduce the number of samples. In addition, it is possible to exhibit existence of a difference between states even if the measuring period is reduced.

Furthermore, in a case of the present embodiment, the observation period $\Delta T$ of the partial observation data 45 is set to have a minimum necessary length that allows an observation target waveform to be analyzed. With this setting, sufficient pieces of partial observation data 45 necessary to make an analysis are secured. Thus, it is possible to reduce the length of the observation period T of the observation data 44 to be a length that allows the application needs to be met. Thus, with the biological-information evaluating device 1 according to the present embodiment, it is possible to exhibit existence of a difference between states even if the measuring period is reduced.

Furthermore, in the present embodiment, the length of the observation period $\Delta T$ is changed on the basis of the setting value of the observation period $\Delta T$ received by the input unit 30. A plurality of pieces of partial observation data 45 is obtained from each of pieces of observation data 44 using the observation period $\Delta T$ with the changed length. On the basis of the obtained plurality of pieces of partial observation data 45, a feature value (for example, the area area_a) of an observation target waveform is generated for each of the pieces of observation data 44. This makes it possible to set the length of the observation period $\Delta T$ to be a length that allows a difference (for example, the effect size d1) between states to be maximized. Thus, with the biological-information evaluating device 1 according to the present embodiment, it is possible to reduce the number of samples, and also to exhibit existence of a difference between states even if the measuring period is reduced.

Furthermore, in the present embodiment, an image signal used to display an image containing an evaluation value (for example, the effect size d1) is generated, and the image is displayed on the basis of the generated image signal. This enables a user to judge whether or not the length of the divided period $\Delta T$ is appropriate, on the basis of the displayed evaluation value (for example, the effect size d1). Judgment as to whether or not the length of the divided period $\Delta T$ is appropriate is able to be made, for example, on the basis of whether or not the evaluation value (for example, the effect size d1) is maximized. Thus, with the biological-information evaluating device 1 according to the present embodiment, it is possible to reduce the number of samples, and also to exhibit existence of a difference between states even if the measuring period is reduced.

In addition, in the present embodiment, the observation period $\Delta T$ of any partial observation data 45 and an observation period of another partial observation data 45 partially overlap with each other. This may further increase the evaluation value (for example, the effect size d1). In this case, it is possible to reduce the number of samples, and also to exhibit existence of a difference between states even if the measuring period is reduced.

Furthermore, in the present embodiment, the length of the overlapping period $\Delta d1$ is changed on the basis of the setting value of the overlapping period $\Delta d1$ received by the input unit 30. A plurality of pieces of partial observation data 45 is obtained from each of pieces of observation data 44 using the overlapping period $\Delta d1$ with the changed length. On the basis of the obtained plurality of pieces of partial observation data 45, a feature value (for example, the area area_a) of an observation target waveform is generated for each of the pieces of observation data 44. This makes it possible to set the length of the overlapping period $\Delta d1$ to be a length that allows a difference (for example, the effect size d1) between states to be maximized. Thus, with the biological-information evaluating device 1 according to the present embodiment, it is possible to reduce the number of samples, and also to exhibit existence of a difference between states even if the measuring period is reduced.

In addition, in the present embodiment, an image signal used to display an image containing an evaluation value (for example, the effect size d1) is generated to display the image on the basis of the generated image signal. This enables a user to judge whether or not the length of the overlapping period $\Delta d1$ is appropriate, on the basis of the displayed evaluation value (for example, the effect size d1). Judgment as to whether or not the length of the overlapping period $\Delta d1$ is appropriate is able to be made, for example, on the basis of whether or not the evaluation value (for example, the effect size d1) is maximized. Thus, with the biological-information evaluating device 1 according to the present embodiment, it is possible to reduce the number of samples, and also to exhibit existence of a difference between states even if the measuring period is reduced.

It should be noted that, in the present embodiment, any divided period $\Delta T$ and another divided period $\Delta T$ may not overlap with each other as illustrated, for example, in FIG.

6. Even with such a configuration, it is possible to obtain effects similar to those of the embodiment described above.

2. Modification Example of First Embodiment

Modification Example A

FIG. 7 is a diagram illustrating a modification example of a schematic configuration of the biological-information evaluating device 1 according to the first embodiment described above. In the present modification example, the storage unit 40 holds a length 46 of a divided period $\Delta W$ and a length 47 of an overlapping period $\Delta d2$, in addition to a program (for example, the processing program 41) to be executed by the signal processing circuit 50, the length 42 of the divided period $\Delta T$, and the length 43 of the overlapping period $\Delta d1$. The length 46 of the divided period $\Delta W$ includes a default value. The length 47 of the overlapping period $\Delta d2$ includes a default value. The divided period $\Delta W$ has a value greater than that of the divided period $\Delta T$, and preferably, has a value greater than that of a $\Delta W1$ that will be described later.

FIG. 8 is a diagram schematically illustrating an example of a procedure of calculating the feature value described above and the evaluation value described above in the biological-information evaluating device 1 according to the present modification example. FIG. 9 is a flowchart of an example of the procedure of calculating the feature value described above and the evaluation value described above in the biological-information evaluating device 1 according to the present modification example.

The signal processing circuit 50 first obtains n-pieces of observation data 44 (samples) from the storage unit 40 (step S301). Then, the signal processing circuit 50 performs steps S102 and S103 described above to derive an analysis result R$\Delta$Ta_b ($1 \leq a \leq n$, $1 \leq b \leq k$) in each of divided periods $\Delta T$ (step S302). For example, the signal processing circuit 50 sets the area fc(t) described above as the analysis result R$\Delta$Ta_b. In addition, the signal processing circuit 50 generates an analysis result R$\Delta$Ta(t) that is a mathematical function of time t within the observation period T, on the basis of the derived analysis result R$\Delta$Ta_b.

Next, as for the analysis result R$\Delta$Ta(t), the signal processing circuit 50 derives a power spectrum P$\Delta$Wa_b(t) for each of divided periods $\Delta W$ (step S302). For example, for each of the analysis results R$\Delta$Ta(t), the signal processing circuit 50 applies FFT to a partial analysis result in each of the divided period $\Delta W$ to derive a power spectrum P$\Delta$Wa_b(t). The power spectrum P$\Delta$Wa_b(t) is a mathematical function of time t within the divided period $\Delta W$, and may include a frequency spectrum of an observation target waveform. For example, the signal processing circuit 50 sets, as the divided period $\Delta W$, a default value of the length 46 of the divided period $\Delta W$ held in the storage unit 40.

Next, the signal processing circuit 50 performs component analysis to derive an analysis result R$\Delta$Wa_b ($1 \leq a \leq n$, $1 \leq b \leq k$) for each of divided period $\Delta W$ (step S303). For example, the signal processing circuit 50 derives an area fcl(t) of a frequency band of an observation target waveform contained in each of power spectrums P$\Delta$Wa_b(t) to set the derived area fcl(t) as the analysis result R$\Delta$Wa_b. Next, the signal processing circuit 50 derives a power spectrum P$\Delta$Wa ($1 \leq a \leq n$) of the analysis result R$\Delta$Wa_b for each of the pieces of observation data 44 (step S304). For example, the signal processing circuit 50 applies FFT to the area fcl(t) in each of the pieces of observation data 44 to derive the power spectrum P$\Delta$Wa.

Next, the signal processing circuit 50 derives an area area_a ($1 \leq a \leq n$) of the power spectrum P$\Delta$Wa in each of the pieces of observation data 44 (step S305). For example, the signal processing circuit 50 derives an area per unit frequency of the power spectrum P$\Delta$Wa in each of the pieces of observation data 44, and an average value of these areas to set the derived areas per unit frequency and the average value of the areas as the area area_a. Next, on the basis of the area area_a in each of the pieces of observation data 44, the signal processing circuit 50 derives the effect size d1. For example, the signal processing circuit 50 assigns the area area_a in each of the pieces of observation data 44 to the expressions (1) to (4) described above to derive the effect size d1.

Next, the signal processing circuit 50 outputs the derived effect size d1 to the display controller 60. Then, the display controller 60 generates an image signal used to display an image containing the effect size d1 and outputs it to the display 70. The display 70 displays an image corresponding to the image signal inputted from the display controller 60. A user judges, on the basis of the effect size d1 displayed on the display 70, whether or not the lengths of the divided periods $\Delta T$ and $\Delta W$ are appropriate or whether or not the lengths of the overlapping periods $\Delta d1$ and $\Delta d2$ are appropriate. Judgment as to whether or not the lengths of the divided periods $\Delta T$ and $\Delta W$ are appropriate is able to be made, for example, on the basis of whether or not the effect size d1 is maximized. Similarly, judgment as to whether or not the lengths of the overlapping periods $\Delta d1$ and $\Delta d2$ are appropriate is able to be made, for example, on the basis of whether the effect size d1 is maximized. It is considered that a value appropriate for each of the lengths of the divided periods $\Delta T$ and $\Delta W$ may vary depending on individual living bodies 100. Similarly, it is considered that a value appropriate for each of the lengths of the overlapping periods $\Delta d1$ and $\Delta d2$ may vary depending on individual living bodies 100.

In a case where the user judges that the length of the divided period $\Delta T$ or $\Delta W$ is necessary to be changed, the user inputs a setting value of the length of the divided period $\Delta T$ or $\Delta W$ into the input unit 30. The input unit 30 outputs the setting value of the length of the divided period $\Delta T$ or $\Delta W$ that is inputted from the user, to the signal processing circuit 50. The signal processing circuit 50 causes the setting value of the divided period $\Delta T$ or $\Delta W$ that is inputted from the input unit 30 to be held in the storage unit 40. In addition, in a case where the user judges that the length of the overlapping period $\Delta d1$ or $\Delta d2$ is necessary to be changed, the user inputs a setting value of the length of the overlapping period $\Delta d1$ or $\Delta d2$ into the input unit 30. The input unit 30 outputs the setting value of the length of the overlapping period $\Delta d1$ or $\Delta d2$ that is inputted from the user, to the signal processing circuit 50. The signal processing circuit 50 causes the setting value of the length of the overlapping period $\Delta d1$ or $\Delta d2$ that is inputted from the input unit 30, to be held in the storage unit 40.

The signal processing circuit 50 judges whether or not to change the length of the divided period $\Delta T$ or $\Delta W$. In a case where a setting value of the length of the divided period $\Delta T$ or $\Delta W$ is newly held in the storage unit 40, or in a case where the setting value of the length of the divided period $\Delta T$ or $\Delta W$ of the storage unit 40 is updated, the signal processing circuit 50 reads out the setting value of the length of the divided period $\Delta T$ or $\Delta W$ from the storage unit 40, and changes the length of the divided period $\Delta T$ or $\Delta W$ on the basis of the read-out setting value (step S307: YES). The signal processing circuit 50 performs the steps S301 to S306 using the divided period ΔT or ΔW with the changed length. In a case where the setting value of the length of the divided period ΔT or ΔW is not held in the storage unit 40, or in a case where the setting value of the length of the divided period ΔT or ΔW in the storage unit 40 is not updated, the signal processing circuit 50 moves to the step S308 (step S307: NO).

The signal processing circuit 50 judges whether or not to change the length of the overlapping period Δd1 or Δd2. In a case where a setting value of the length of the overlapping period Δd1 or Δd2 is newly held in the storage unit 40, or in a case where the setting value of the length of the overlapping period Δd1 or Δd2 in the storage unit 40 is updated, the signal processing circuit 50 reads out the setting value of the length of the overlapping period Δd1 or Δd2 from the storage unit 40, and changes the length of the overlapping period Δd1 or Δd2 on the basis of the read-out setting value (step S308: YES). The signal processing circuit 50 performs steps S301 to S307 using the overlapping period Δd1 or Δd2 with the changed length. In a case where the setting value of the length of the overlapping period Δd1 or Δd2 is not held in the storage unit 40 or in a case where the setting value of the length of the overlapping period Δd1 or Δd2 in the storage unit 40 is not updated, the signal processing circuit 50 ends the process.

In the present modification example, a power spectrum PΔTa_b is derived for each of partial observation data 45. Component analysis is performed for each of the derived power spectrums PΔTa_b to obtain data on the basis of the component analysis (analysis result RΔTa). A power spectrum RΔWa_b contained in the analysis result RΔTa is derived for each piece data having a divided period ΔW longer than the divided period ΔT, the power spectrum RΔWa_b being. Component analysis is performed for each of the derived power spectrums RΔWa_b. On the basis of the component analysis, the effect size d1 is generated for each of the pieces of observation data 44. This makes it possible to obtain effects similar to those of the embodiment described above.

It should be noted that, in the present modification example, any divided period ΔT and another divided period ΔT may not overlap with each other as illustrated, for example, in FIG. 10. In addition, any divided period ΔW and another divided period ΔW may not overlap with each other. In these cases, it is also possible to obtain effects similar to those in the modification example described above.

Modification Example B

In the modification example A described above, the biological-information evaluating device 1 may cause the storage unit 40 to hold a learning model 48 as illustrated, for example, in FIG. 11. The learning model 48 is used, for example, to perform a learning procedure illustrated in FIG. 12 or to perform an estimating procedure illustrated in FIG. 13.

Here, an SΔTa_b(t) represents an area of a frequency band of an observation target waveform contained in a power spectrum PΔTa_b(t) ($1 \le a \le h$, $1 \le b \le j$), the power spectrum PΔTa_b(t) being derived from each of j-pieces of divided periods ΔT in each of h-pieces of observation data 44 used for learning (see FIG. 12). In addition, an SΔWa_b(t) represents an area of a frequency band of an observation target waveform contained in a power spectrum PΔWa_b(t) ($1 \le a \le h$, $1 \le b \le j$), the power spectrum PΔWa_b(t) being derived from each of j-pieces of divided periods ΔW obtained through dividing in each of the h-pieces of observation data 44 used for learning (see FIG. 12). An E(t) represents an emotional state in an observation period T in each of the h-pieces of observation data 44 used for learning. Note that the number (h pieces) of pieces of observation data 44 used for learning is equal to the number (n pieces) of pieces of observation data 44 at the time of estimating an emotion that will be described later. In addition, the number (k pieces) of divisions of observation data 44 at the time of learning may be equal to or different from the number (j pieces) of divisions of observation data 44 at the time of estimating an emotion that will be described later. Furthermore, in both of the area SΔTa_b(t) and the area SΔWa_b(t), data exist at the same time in an observation period T.

In the area SΔTa_b(t) and the area SΔWa_b(t), the learning model 48 represents a model obtained through learning such as machine learning using, as an explanatory variable, 2n-pieces of data each having the same "b" and also using, as an object variable, an emotional state E(t) in a period corresponding to the "b" from among emotional states E(t) (see FIG. 14). In other words, the learning model 48 is a model used to estimate one emotional state from 2n-pieces of data.

The signal processing circuit 50 derives a power spectrum PΔTa_b(t) ($1 \le a \le n$, $1 \le b \le k$) for each of the k-pieces of divided periods ΔT in each of the n-pieces of observation data 44 that have been actually measured, to derive an area RΔTa_b(t) of a frequency band of an observation target waveform contained in the derived power spectrum PΔTa_b(t) (see FIG. 13). In addition, the signal processing circuit 50 derives a power spectrum PΔWa_b(t) ($1 \le a \le n$, $1 \le b \le k$) for each of the k-pieces of divided periods ΔW in each of the n-pieces of observation data 44 that have been actually measured, to derive an area RΔWa_b(t) of a frequency band of an observation target waveform contained in the derived power spectrum PΔWa_b(t) (see FIG. 13).

In the learning model 48, in a case where 2n-pieces of data having the same "b" are inputted in the area RΔTa_b and the area RΔWa_b, each of which is derived in the signal processing circuit 50, emotional states Out_b each corresponding to each of these 2n-pieces of data are outputted to the signal processing circuit 50 (see FIG. 13).

Here, it is assumed that, in a case where actual emotional states each corresponding to each of the area RΔTa_b and the area RΔWa_b are all equal, i-pieces ($i \le k$) of emotional states out of the emotional states Out_b match the actual emotional state. At this time, the accuracy of estimation is i/k.

In a case of the present modification example, the learning model 48 is used to estimate the emotional state Out_b. With the effect size d1 obtained in the embodiment described above, it is possible to estimate, for example, two states: a high vigilance level and a low vigilance level. On the other hand, using a learning model, the present modification example is able to estimate, for example, a middle-level state such as what extent the vigilance level is high or what extend the vigilance level is low, in addition to the vigilance being high or low. Thus, in the present modification example, it is possible to obtain an accuracy of estimation higher than that of the embodiment described above.

Furthermore, the present modification example uses the learning model 48 to estimate the emotional state Out_b. Thus, it is possible to make an estimation using a reduced number of pieces (n pieces) of observation data 44 at the time of estimating an emotion, as compared with the number of pieces of data used in the embodiment described above, and it is possible to make the estimation using only one piece of data. This makes it possible to estimate an emotion even in a case where it is not possible to obtain a large number of pieces (n pieces) of observation data 44 at the time of estimating an emotion.

Modification Example C

In the modification example B described above, the biological-information evaluating device 1 may use a model obtained through learning such as machine learning using, as an explanatory variable, the area $S\Delta Ta\_b(t)$ for each "b" and also using, as an object variable, an emotional state $E(t)$ in a period corresponding to the "b" out of emotional states $E(t)$, as illustrated, for example, in FIG. 14. In other words, in the present modification example, the learning model 48 is a model used to estimate one emotional state on the basis of n-pieces of data.

The signal processing circuit 50 derives a power spectrum $P\Delta Ta\_b(t)$ ($1 \leq a \leq n$, $1 \leq b \leq k$) for each of k-pieces of divided periods $\Delta T$ in each of n-pieces of observation data 44 that have been actually measured, to derive an area $R\Delta Ta\_b(t)$ of a frequency band of an observation target waveform contained in the derived power spectrum $P\Delta Ta\_b(t)$ (see FIG. 15).

In the learning model 48, the area $R\Delta Ta\_b$ derived by the signal processing circuit 50 is inputted for each "b," and emotional states Out_b each corresponding to each of n-pieces of inputted data are outputted to the signal processing circuit 50 (see FIG. 15).

Here, it is assumed that, in a case where actual emotional states each corresponding to each of areas $R\Delta Ta\_b$ are all equal, i-pieces ($i \leq k$) of emotional states out of the emotional states Out_b match the actual emotional states. At this time, the accuracy of estimation is $i/k$.

In the present modification example, the learning model 48 is used to estimate the emotional state Out_b. With the effect size d1 obtained in the embodiment described above, it is possible to estimate, for example, two states: a high vigilance level and a low vigilance level. On the other hand, using a learning model, the present modification example is able to estimate, for example, a middle-level state such as what extent the vigilance level is high or what extent the vigilance level is low, in addition to the vigilance level being high or low. Thus, in the present modification example, it is possible to obtain an accuracy of estimation higher than that of the embodiment described above.

Next, with reference to FIGS. 16 and 17, effects of the biological-information evaluating device 1 according to the modification examples B and C described above will be described.

FIG. 16 is a diagram illustrating an example of a relationship between a length of the divided period $\Delta W$ and an accuracy of estimation in a model in which the divided period $\Delta T$, the overlapping period $\Delta d1$, and the overlapping period $\Delta d2$ are each fixed to a certain value. FIG. 17 is a diagram illustrating an example of an accuracy of estimation in a case where the length of the divided period $\Delta W$ is fixed to a value ($\Delta W2$) greater than the $\Delta W1$ in the model illustrated in FIG. 16. In FIGS. 16 and 17, an example of the accuracy of estimation according to the modification examples B and C is given. It is apparent from FIGS. 16 and 17 that, in the modification example B, it is possible to estimate states with accuracy higher than that of the modification example C when the length of the divided period $\Delta W$ is equal to or greater than $\Delta W1$. Note that the numerical values in FIGS. 16 and 17 are merely examples. Depending on applications, numerical values higher than the numerical values in FIGS. 16 and 17 may be obtained.

3. Second Embodiment

[Configuration]

Next, a biological-information evaluating device 2 according to a second embodiment of the present disclosure will be described. FIGS. 18, 19, and 20 are diagrams each illustrating an example of a schematic configuration of the biological-information evaluating device 2 including the biological-information evaluating device 1 according to the first embodiment described above and the modification examples A, B, and C of the first embodiment.

The biological-information evaluating device 2 includes, for example, a biological-information observing device 210 and a biological-information analyzing device 220.

The biological-information observing device 210 includes, for example, the detector 10, the ADC 20, a signal processing circuit 211, and a communicating section 212. The signal processing circuit 211 includes a processor. For example, the signal processing circuit 211 controls acquisition of the observation data 44 by the detector 10, and also controls transmission, by the communicating section 212, of the acquired observation data 44. The communicating section 212 transmits the observation data 44 to the biological-information analyzing device 220 in accordance with the control by the signal processing circuit 211.

The biological-information analyzing device 220 is, for example, a mobile terminal, a smartphone, or a tablet having a communication function. The biological-information analyzing device 220 includes, for example, a communicating section 221, the input unit 30, the storage unit 40, the signal processing circuit 50, the display controller 60, and the display 70. The communicating section 221 receives the observation data 44 transmitted from the biological-information observing device 210, and outputs the received observation data 44 to the signal processing circuit 50. For example, near-field wireless communication is employed for communication between the communicating section 212 and the communicating section 221. The near-field wireless communication is achieved using, for example, ISO/IEC14443 (international standard for near-field RFID), ISO/IEC18092 (international standard for wireless communication called an NFC), ISO/IEC15693 (international standard for RFID), Bluetooth (registered trademark), or the like. Note that the communication between the communicating section 212 and the communicating section 221 may be achieved, for example, through a wired LAN (Local Area Network), a wireless LAN such as Wi-Fi, or mobile phone lines.

In the present embodiment, it is also possible to exhibit existence of a difference between states with a small number of samples and a short measuring period, as in the first embodiment and the modification examples A, B, and C of the first embodiment. In addition, with the present embodiment, it is possible to reduce the number of samples, and also to exhibit existence of a difference between states even if the measuring period is reduced, as in the first embodiment described above and the modification examples A, B, and C of the first embodiment.

It should be noted that the effects described in the present description are merely examples. The effects of the present disclosure are not limited to the effects described in the present description. The present disclosure may have effects other than the effects described in the present description.

For example, the series of processes described above are able to be performed with software, and alternatively, are able to be performed with hardware.

In addition, the first and second embodiments and the modification examples A, B, and C of the first embodiment are able to be applied to applications in which brainwaves are measured to know a state in which the vigilance level (stress) is high and a state in which the vigilance level (stress) is low. However, it is possible to apply them to other applications. For example, the first and second embodiments and the modification examples A, B, and C according to the first embodiment are able to be applied to applications of knowing a difference between states in gaming, e-sports, motion picture, music, healthcare, medicine, education, driving of mobile bodies such as automobiles, or other applications. For example, in a case of gaming, by knowing a difference of degrees of user's immersion, a difference of degrees of user's excitement, or the like, it is possible to change a scenario or the degree of difficulty.

Furthermore, in a case of the first and second embodiments and the modification examples A, B, and C of the first embodiment, the target of measurement is a living body. However, the target of measurement is not limited to a living body. It is possible to apply the present disclosure to a field in which an observation target waveform is known, and observation data 44 containing the known observation target waveform is able to be obtained using the detector 10. In addition, in a case of the first and second embodiments and the modification examples A, B, and C of the first embodiment, the observation target is a human. However, the observation target may be livestock or an animal in a zoo, an aquarium, or the like. In a case where the observation target is livestock or an animal in a zoo, an aquarium or the like, it is possible to use the first and second embodiments and the modification examples of the first embodiment, for example, to detect stress of the animal or the like.

Furthermore, it is possible for the present disclosure to take, for example, the following configurations.

(1) A biological-information evaluating device including
a signal processing circuit that generates a feature value of an observation target waveform for each of pieces of observation data obtained through observation of a living body for a predetermined period, on a basis of a plurality of pieces of partial observation data contained in each of the pieces of observation data and each having an observation period shorter than an observation period of the observation data.

(2) The biological-information evaluating device according to (1), in which the signal processing circuit generates an evaluation value concerning a difference in the observation target waveform between the pieces of observation data, on a basis of the feature value for each of the pieces of observation data.

(3) The biological-information evaluating device according to (2), in which the evaluation value is an effect size.

(4) The biological-information evaluating device according to any one of (1) to (3), in which the observation period of each of the pieces of the partial observation data has a minimum necessary length that allows the observation target waveform to be analyzed.

(5) The biological-information evaluating device according to (2) or (3), further including:
an input unit that receives input of a setting value concerning a length of the observation period of each of the pieces of partial observation data, in which
the signal processing circuit
changes the length of the observation period of each of the pieces of the partial observation data on a basis of the setting value received at the input unit,
obtains the plurality of pieces of partial observation data from each of the pieces of observation data using the observation period with the changed length, and
generates a feature value of an observation target waveform for each of the pieces of observation data on a basis of the obtained plurality of pieces of the partial observation data.

(6) The biological-information evaluating device according to (5), further including:
a display controller that generates an image signal used to display an image containing the evaluation value; and
a display that displays the image on a basis of the image signal from the display controller.

(7) The biological-information evaluating device according to any one of (1) to (6), in which an observation period of one of the pieces of partial observation data and an observation period of another one of the pieces of partial observation data partially overlap with each other.

(8) The biological-information evaluating device according to (7), further including:
an input unit that receives input of a setting value concerning a length of an overlapping period where an observation period of one of the pieces of partial observation data and an observation period of another one of the pieces of partial observation data overlap, in which
the signal processing circuit
changes the length of the overlapping period on a basis of the setting value received at the input unit,
obtains the plurality of pieces of partial observation data from each of the pieces of observation data using the overlapping period with the changed length, and
generates a feature value of an observation target waveform for each of the pieces of observation data on a basis of the obtained plurality of pieces of partial observation data.

(9) The biological-information evaluating device according to (8), further including:
a display controller that generates an image signal used to display an image containing the evaluation value; and
a display that displays the image on a basis of the image signal from the display controller.

(10) The biological-information evaluating device according to any one of (1) to (9), further including
a detector that obtains each of the pieces of observation data through observation of a living body.

(11) The biological-information evaluating device according to any one of (1) to (10), in which
the signal processing circuit
derives a first power spectrum for each of the pieces of partial observation data,
performs component analysis for the derived first power spectrum; and
generates the feature value for each of the pieces of observation data on a basis of the component analysis.

(12) The biological-information evaluating device according to any one of (1) to (10), in which
the signal processing circuit
derives a first power spectrum for each of the pieces of partial observation data, performs component analysis for the derived first power spectrum, derives a second power spectrum for each of the plurality of pieces of data contained in data obtained on a basis of the component analysis and having a second period longer than the first period, performs component analysis for the derived second power spectrum, and generates the feature value for each of the pieces of observation data on a basis of the component analysis.

(13) The biological-information evaluating device according to claim 1, in which the signal processing circuit derives a first power spectrum for each of the pieces of partial observation data, performs component analysis for the derived first power spectrum to obtain first data on a basis of the component analysis, derives a second power spectrum for each of a plurality of pieces of data contained in the observation data and having a second period longer than the first period, performs component analysis for the derived second power spectrum to obtain second data on a basis of the component analysis, and obtains an emotional state on a basis of the first data and the second data.

(14) The biological-information evaluating device according to claim 1, in which the signal processing circuit derives a power spectrum for each of the pieces of partial observation data, performs component analysis for the derived power spectrum, and obtains an emotional state on a basis of data obtained on a basis of the component analysis.

(15) A method of evaluating biological information using a signal processing circuit to perform a signal process including:

generating a feature value of an observation target waveform for each of pieces of observation data obtained through observation of a living body for a predetermined period, on a basis of a plurality of pieces of partial observation data contained in each of the pieces of observation data and each having an observation period shorter than an observation period of the observation data.

The present application claims priority based on Japanese Patent Application No. 2018-078807 filed with the Japan Patent Office on Apr. 17, 2018, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A biological-information evaluating device comprising:
a signal processing circuit configured to:
generate a feature value of an observation target waveform for each of pieces of observation data obtained through observation of a living body for a predetermined period, on a basis of a plurality of pieces of partial observation data contained in each of the pieces of observation data and each having a first period shorter than an observation period of the observation data, derive a first power spectrum for each of the pieces of partial observation data, yielding a plurality of first power spectra, perform first component analysis for each of the plurality of first power spectra, yielding a plurality of first analysis result spectra, each of the plurality of analysis result spectra corresponding to a respective first power spectrum of the plurality of first power spectra, derive a second power spectrum for each of the plurality of first analysis result spectra, yielding a plurality of second power spectra, each of the plurality of second power spectra corresponding to a respective first analysis result spectrum of the plurality of first analysis result spectra, perform second component analysis for each of the plurality of second power spectra, yielding a plurality of second analysis result spectra, each of the plurality of second analysis result spectra corresponding to a respective second power spectrum of the plurality of second power spectra, and perform third component analysis for each of the plurality of second analysis result spectra, yielding a respective effect size for each of the pieces of partial observation data.

2. The biological-information evaluating device according to claim 1, wherein the signal processing circuit generates an evaluation value concerning a difference in the observation target waveform between the pieces of observation data, on a basis of the feature value for each of the pieces of observation data.

3. The biological-information evaluating device according to claim 1, wherein the first period has a minimum necessary length that allows the observation target waveform to be analyzed.

4. The biological-information evaluating device according to claim 2, further comprising:
an input unit that receives input of a setting value concerning a length of the first period, wherein the signal processing circuit:
changes the length of the first period on a basis of the setting value received at the input unit;
obtains the plurality of pieces of partial observation data from each of the pieces of observation data with the changed length; and
generates a feature value of an observation target waveform for each of the pieces of observation data on a basis of the obtained plurality of pieces of partial observation data.

5. The biological-information evaluating device according to claim 4, further comprising:
a display controller that generates an image signal used to display an image containing the evaluation value; and
a display that displays the image on a basis of the image signal from the display controller.

6. The biological-information evaluating device according to claim 1, wherein one of the first periods and another one of the first periods partially overlap with each other.

7. The biological-information evaluating device according to claim 6, further comprising:
an input unit that receives input of a setting value concerning a length of an overlapping period where one of the first periods and another one of the first periods overlap, wherein the signal processing circuit:
    changes the length of the overlapping period on a basis of the setting value received at the input unit,
    obtains the plurality of pieces of partial observation data from each of the pieces of observation data using the overlapping period with the changed length, and
    generates a feature value of an observation target waveform for each of the pieces of observation data on a basis of the obtained plurality of pieces of partial observation data.

8. The biological-information evaluating device according to claim 7, further comprising:
    a display controller that generates an image signal used to display an image containing the evaluation value; and
    a display that displays the image on a basis of the image signal from the display controller.

9. The biological-information evaluating device according to claim 1, further comprising a detector that obtains each of the pieces of observation data through observation of a living body.

10. The biological-information evaluating device according to claim 1, wherein the signal processing circuit is further configured to generate the feature value for each of the pieces of observation data on a basis of the component analysis.

11. The biological-information evaluating device according to claim 1, wherein the signal processing circuit is further configured to:
    obtain second data on a basis of the component analysis, and
    obtain an emotional state on a basis of the first data and the second data.

12. A method of evaluating biological information using a signal processing circuit to perform a signal process including:
    generating a feature value of an observation target waveform for each of pieces of observation data obtained through observation of a living body for a predetermined period, on a basis of a plurality of pieces of partial observation data contained in each of the pieces of observation data and each having an observation period shorter than an observation period of the observation data;
    deriving a first power spectrum for each of the pieces of partial observation data, yielding a plurality of first power spectra,
    performing first component analysis for each of the plurality of first power spectra, yielding a plurality of first analysis result spectra, each of the plurality of analysis result spectra corresponding to a respective first power spectrum of the plurality of first power spectra,
    deriving a second power spectrum for each of the plurality of first analysis result spectra, yielding a plurality of second power spectra, each of the plurality of second power spectra corresponding to a respective first analysis result spectrum of the plurality of first analysis result spectra,
    performing second component analysis for each of the plurality of second power spectra, yielding a plurality of second analysis result spectra, each of the plurality of second analysis result spectra corresponding to a respective second power spectrum of the plurality of second power spectra, and
    performing third component analysis for each of the plurality of second analysis result spectra, yielding a respective effect size for each of the pieces of partial observation data.

* * * * *